United States Patent
Miura

(10) Patent No.: US 8,746,821 B2
(45) Date of Patent: Jun. 10, 2014

(54) PRINT CONTROL DEVICE, PRINTING APPARATUS AND METHOD OF PROVIDING INFORMATION IN PRINTING APPARATUS

(75) Inventor: Hirotsuna Miura, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 355 days.

(21) Appl. No.: 13/194,803

(22) Filed: Jul. 29, 2011

(65) Prior Publication Data

US 2012/0026545 A1 Feb. 2, 2012

(30) Foreign Application Priority Data

Jul. 30, 2010 (JP) ................. 2010-171620

(51) Int. Cl.
*B41J 29/38* (2006.01)
*G06K 15/02* (2006.01)

(52) U.S. Cl.
USPC .............. 347/5; 347/40; 347/14; 358/1.13; 358/1.15

(58) Field of Classification Search
CPC ................. B41J 29/38; G06K 15/02
See application file for complete search history.

(56) References Cited

U.S. PATENT DOCUMENTS

| | | | |
|---|---|---|---|
| 7,311,379 B2 | 12/2007 | Mitsuzawa | |
| 2003/0231345 A1* | 12/2003 | Azami | 358/1.18 |
| 2004/0046830 A1 | 3/2004 | Mitsuzawa | |
| 2010/0156972 A1* | 6/2010 | Sakai | 347/9 |
| 2011/0175962 A1* | 7/2011 | Miura et al. | 347/19 |
| 2011/0273741 A1* | 11/2011 | Mukasa | 358/1.15 |

FOREIGN PATENT DOCUMENTS

JP 2004-025551 1/2004

\* cited by examiner

*Primary Examiner* — Manish S Shah
*Assistant Examiner* — Jeremy Delozier
(74) *Attorney, Agent, or Firm* — Maschoff Brennan

(57) ABSTRACT

A controller includes an information transferring unit in a main control unit. A mechanical controller transmits device state information at predetermined time intervals. The information transferring unit performs some processing on the device state information received from the mechanical controller as necessary and stores the information in a second storage unit. Upon receiving a device state acquisition command from a host control unit, the information transferring unit transmits device state information read out from the second storage unit to the host control unit as a response to the device state acquisition command.

15 Claims, 10 Drawing Sheets

PRINT CONTROL DEVICE, PRINTING APPARATUS AND METHOD OF PROVIDING INFORMATION IN PRINTING APPARATUS

This application claims the benefit of Japanese Application No. 2010-171620, filed Jul. 30, 2010, all of which are hereby incorporated by reference.

BACKGROUND

1. Technical Field

The present invention relates to a print control device that controls a printing unit in a printing apparatus, to a printing apparatus and to a method of providing information in a printing apparatus.

2. Related Art

For example, a printing apparatus that is equipped with a plurality of recording heads that eject ink (fluid ejecting units) is disclosed in JP-A-2004-25551. In this printing apparatus, a plurality of print heads and a plurality of driving control units that control driving of the plurality of print heads are mounted on a carriage provided so as to be capable of reciprocating. Furthermore, a plurality of data processing units that transfer data to the individual driving control units are mounted in the main body of the printing apparatus. A plurality of circuit sets each consisting of one driving control unit and one data processing unit are connected to every predetermined number of print heads in a main control unit that controls reciprocation of the carriage. With this printing apparatus, since a configuration is adopted in which every predetermined number of print heads is provided with one of a plurality of circuit sets, the processing load on each data processing unit is reduced.

Furthermore, in the case where there are a large number of print heads, it has been thought that it would be effective to adopt a printing apparatus configuration in which two or more main control units are provided and a print control device, in which a main control unit, a data processing unit and a driving control unit form a circuit set, is formed on a single substrate. This substrate is then provided in a plurality. With this configuration, since a large number of recording heads are allocated to and controlled by a plurality of print control devices, as the number of recording heads increases, the number of print control devices also increases, whereby the load on each print control device remains relatively small and the required print processing speed can be ensured.

In this case, various control commands, such as a carriage initiating command, which is to be output at a stage when all the preparation for starting recording with a plurality of recording heads that the individual print control devices are in charge of has been performed, and a transport command, which is to be output to initiate transport of a recording medium once recording has finished, are individually managed by the print control devices. Consequently, it is necessary that the timings at which these control commands are output be synchronized between the two or more print control devices. For example, one print control device is made the master (master-side print control device) and another print control device is made the slave (slave-side print control device). A configuration is adopted in which, at a stage when a command to be output by the master-side print control device and a command to be output by the slave-side print control device are both present, the individual print control devices transmit these commands to the driving control unit (mechanical controller or the like) of the carriage system and the transport system in synchronization with each other. With such a configuration, it becomes possible to control ink ejection processing for individual recording heads, which are respectively controlled by the print control devices, and transport processing for a printing medium controlled by a driving control unit to be at suitable timings.

In addition to a plurality of recording heads being allocated to a plurality of print control devices, it is preferable that components included in the printing apparatus in a plurality, such as a plurality of ink cartridges that supply ink to the recording heads and nozzle testing devices that test for clogging of the nozzles of the recording heads, be allocated to and connected to a plurality of print control devices and that their loads be allocated among the individual print control devices. Here, typically, memory elements, into which ink-related information such as information on the amounts of ink remaining and the colors of ink has been written, are provided in ink cartridges and the individual print control devices are allocated with and manage the ink-related information such as the amount of ink remaining for each ink by accessing the memory elements of the ink cartridges they are in charge of.

Furthermore, in this type of printing apparatus, there are cases where a host control unit acquires state (status) information regarding a driving control device via the individual print control devices and issues instructions in accordance with the states at that time. In such a case, the host control unit transmits an information acquisition command to a print control device and the print control device then transmits the received information acquisition command to the driving control device. Then, the print control device transmits information transmitted from the driving control device as a response to the host control unit.

Sometimes cases occur in which a command (internal command) is individually generated in only a certain print control device among a plurality of print control devices. For example, an error in a component such as a recording head, ink cartridge, nozzle testing device or the like that the print control device is in charge of such as an out of ink error (end of ink error) or a clogged nozzle error for a nozzle testing device in an ink cartridge that a print control device is in charge of, are examples of internal commands generated just within the certain print control device.

For example, when an internal command is generated by a master-side print control device, an internal command is not generated by the other slave-side print control device. Consequently, there is a problem in that when synchronization needs to be attained in order for the master-side print control device to output an internal command, since the command is not present in the slave-side print control device, the internal command cannot be output. For example, if a configuration is adopted in which a plurality of print control devices are connected to one another through communication lines and internal commands are also transferred from one print control device to the other print control devices, in the synchronization processing, since a certain internal command is present in all the individual print control devices, the internal command is then able to be output. Typically, a print control device includes a queue in which commands are stored in the order in which they were obtained and the commands are output in the order in which they are stored in the queue.

In the case where an internal command is transmitted by communication though a communication line between a plurality of print control devices, the internal command arrives at the print control device that is to be the recipient of the internal command after an amount of time necessary to perform the communication (communication time) from the time at which the command was generated in print control device that was the sender of the internal command. For example, after an internal command has been generated by one print control device, if each of the print control devices receives a state information acquisition command from the host control unit during the time up until the internal command arrives at the other print control device, the orders in which the commands are stored in the queues in the respective print control devices will become different. As a result, in the synchronization processing, there will be a problem in that the respective commands to be output from the print control devices will not match and a command transmission error will be generated.

Furthermore, internal commands may include commands for detecting the states of devices or the states of components such as ink cartridges or the like and for making notification of an OK state or an NG state in response to a detection result in order to cause the printing apparatus to perform a predetermined operation such as when initiating the printing apparatus or when an ink cartridge is to be replaced. In such a case, when the state is the OK state, an OK state command (normal state command) is issued and when the state is the NG state, an NG state command (abnormal state command) is issued. In the case where the expiration date of an ink cartridge has passed, printing can be performed using the ink cartridge as is even though it is not optimal. Consequently, in the case where an NG state is detected because the expiration date has passed, an NG state command is transmitted to the host control unit, the host control unit prompts the user to select whether to use the non-optimal component as is or to replace the non-optimal component with a satisfactory component, and when an input is made to use the ink cartridge as is, the error is cleared and an OK state command is issued.

In such a case, when one printing control device has an OK state and another print control device has an NG state, when the print control devices receive an information acquisition command from the host control unit in the period up until the other print control device receives an OK state command once the error has been cleared, the orders in which commands are stored in the queues in the respective print control devices will become different. Of course, in addition to this reason, there are various other reasons why the orders in which commands are stored in the queues may become different.

Thus, if a configuration is adopted in which the individual print control devices transmit an information acquisition command received from the host control unit to the driving control device and transmit state information acquired from the driving control device to the host control unit as a response to the information acquisition command, the frequency with which the orders in which the commands are stored in the queues become different in the individual print control devices will be high. For such a case, adding error avoidance processing (an error avoiding unit) to the synchronization processing as a countermeasure to avoid generation of errors in cases where the orders in which the commands are stored in queues have become different has been considered. However, if a configuration is adopted in which information acquisition commands are stored in queues, the frequency with which error avoidance processing is executed will increase and when the error avoidance processing is executed, the frequency with which the orders in which commands are stored in the queues in the print control devices become different due to the information acquisition commands will increase and therefore there is a concern that a problem will occur in that for example command output processing will not progress smoothly.

SUMMARY

An advantage of some aspects of the invention is that a print control device, a printing apparatus and a method of providing information in the printing apparatus are provided with which, in a configuration in which commands are synchronously transmitted to a driving control from a plurality of print control devices, state information can be transmitted to a host control unit from the driving control unit while avoiding a situation in which other commands come to be not smoothly output to the driving control unit due to information acquisition commands received from the host control unit.

According to a first aspect of the invention, there is provided a print control device for a printing apparatus that is equipped with a plurality of print control devices, which are allocated with and control printing units on the basis of print data from a host control unit, and is equipped with a driving control unit that controls driving of mechanical printing mechanisms on the basis of commands from the print control devices. The print control device includes an information receiving unit that receives state information transmitted from the driving control unit at periodic or non-periodic time intervals and stores the state information in a storage unit; a response unit that, upon receiving an information acquisition command from the host control unit, responds by transmitting state information stored in the storage unit to the host control unit; an input unit that inputs a first command; a command generating unit that generates a second command inside the print control device; a management unit that manages first and second commands in the order in which the commands were acquired and outputs the first and second commands in the order in which the commands were acquired; an output unit that the outputs commands received from the management unit to the driving control unit; a synchronizing unit that, upon confirming that the same command is present in the respective output units of the plurality of print control devices, allows the output units to output the command, and an avoidance unit that performs avoidance processing to avoid an error that occurs in the synchronizing unit when the second command is not present in the respective output units of all of the plurality of print control devices. The information acquisition command is not input to the management unit.

According to this aspect of the invention, upon receiving state information transmitted from the driving control unit at periodic or non-periodic time intervals, the information receiving unit of the print control device stores the state information in the storage unit. Furthermore, upon receiving an information acquisition command from the host control unit, the response unit of the print control device responds by transmitting the state information stored in the storage unit to the host control unit. Therefore, the receiving of state information from the driving control unit and the transmitting (response) of state information to the host control unit in response to the information acquisition command are performed asynchronously. Furthermore, first and second commands are managed by the management unit in the order in which the commands were acquired and are output to the output unit in the order in which the commands were acquired and managed. Upon confirming that the same command is present in the respective output units of the plurality of print control devices, the synchronizing unit allows the command to be output to the driving control unit. However, in the case where the command generating unit has generated a second command, the avoidance unit performs avoidance processing, whereby an error in the synchronizing unit that would occur due to the second command not being present in the output unit of another print control device is avoided. In addition, a state acquisition command transmitted from the host control unit is not stored in the management unit. Consequently, inconvenience can be avoided such as in the case where if state acquisition commands were simply stored in the management unit, error avoidance performed using the avoidance unit would be difficult and the load of avoidance processing would be increased and outputting of the first and second commands would be delayed. Therefore, it is not necessary to transmit information acquisition commands from the host control unit to the driving control unit and therefore, even when information acquisition commands are transmitted to the print control device comparatively often, state information can be transmitted to the host control unit from the driving control unit while avoiding a situation in which other commands come to be not smoothly output to the driving control unit due to the information acquisition commands.

In the print control device according to this aspect of the invention, the response unit is preferably provided midway along a transmission path from the host control unit up to where a command is acquired by the management unit.

According to this aspect of the invention, since the response unit is preferably provided midway along a transmission path from the host control unit up to where a command is acquired by the management unit, a situation in which information acquisition commands accumulate in the management unit along with other commands can be avoided and therefore for example the occurrence of a situation in which the orders of command queues of the respective management units of the print control devices become different can be reduced.

In the print control device according to this aspect of the invention, the avoidance unit is preferably a communication unit that transmits the second command to another print control device.

According to this aspect of the invention, the command generating unit of the print control device transmits a generated second command to another print control device via the communication unit and receives a second command generated by the command generating unit of the other print control device from the other print control device via the communication unit. In this case, the second command transmitted from the other print control device via the communication unit arrives after some period of time, but even if a state acquisition command is transmitted from the host control unit during this time, the state acquisition command is not stored in the management unit and therefore the occurrence of a situation in which the orders of queues of this type of command in the respective management units become different in the plurality of print control devices can be reduced.

In the print control device according to this aspect of the invention, a plurality of components included in the printing apparatus are preferably allocated to and connected to the plurality of print control devices and the print control device preferably further includes a detection unit that detects the states of the components allocated thereto and the command generating unit preferably generates a second command on the basis of a detection result of the detection unit.

According to this aspect of the invention, a second command generated on the basis of the detection result of the detection unit that detects the states of components allocated to and connected to the print control device only exists inside the one print control device to which the component, which is a target of detection, is allocated. In this case, the occurrence of an error in the synchronizing unit caused by a command to be output not being present in all of the plurality of print control devices can be reduced.

In the print control device according to this aspect of the invention, at least one of the detection units is preferably a unit that detects a non-optimal component among the plurality of components, the command generating unit preferably, if the detection unit detects a non-optimal component, generates an abnormal state command as a second command and transmits the command to the host control unit, and, if on the other hand the detection unit detects a satisfactory component, the command generating unit generates a normal state command as a second command and transmits the command to the output unit. The host control unit preferably, upon receiving the abnormal state command, displays guidance including selection options prompting selection of whether or not to use the non-optimal component, and when selection is made to use the non-optimal component from among the selection options in the displayed guidance, performs error clearance notification in which the print control device is told to regard the non-optimal component as satisfactory. The avoidance unit is preferably formed of a function in which the command generating unit generates a normal state command, which is issued in the case where a component is satisfactory, upon receiving an error clearance notification.

According to this aspect of the invention, a predetermined number of components among a plurality of components allocated to the respective print control devices are connected to the print control device. Then, if the detection unit detects a non-optimal component among the components allocated to the print control device and the component is determined to be a non-optimal component from the detection result, the command generating unit generates and transmits an abnormal state command to the host control unit. The host control unit having received the abnormal state command, displays guidance including selection options prompting selection of whether or not to use the non-optimal component, and when a selection result is input to use the non-optimal component in the displayed guidance, the host control unit transmits an error clearance notification to the print control device. Upon receiving the error clearance notification, the command generating unit of the print control device comes to regard the non-optimal component as satisfactory and generates and transmits a normal state command to the management unit. On the other hand, if a component is determined to be a satisfactory component from the detection results of the detection unit, the command generating unit generates and transmits a normal state command to the management unit. For example, in the case where the respective detection results of the plurality of print control devices are different, an abnormal state command is transmitted to the host control device by one print control device and a normal state command is stored in the management unit in the other print control device. A normal state command is transmitted to the output unit first from the management unit in the one print control device and a normal state command is not issued by the other print control device until an error clearance notification is transmitted once there has been input of a selection made in the guidance displayed based on the abnormal state command. During this time, even if a state acquisition command is transmitted from the host control unit to the print control device, the state acquisition command is not stored in the management unit and therefore the occurrence of a situation in which the orders of command queues in the respective management units become different in the plurality of print control devices can be reduced.

In the print control device according to the aspect of the invention, the avoidance unit is preferably formed of a function in which the output unit determines whether a command received from the management unit is a first command or a second command and when the command is a first command the output unit outputs the command while synchronization is performed by the synchronizing unit and when the command is a second command the output unit outputs the command without the synchronizing unit performing synchronization.

According to this aspect of the invention, the output unit determines whether a command received from the management unit is a first command or a second command. In the case of a first command, the output unit outputs the first command to the driving control unit while synchronization is performed by the synchronization unit, whereas in the case of a second command, the second command is output to the driving control unit without synchronization being performed by the synchronization unit. As a result, the occurrence of synchronization errors in which a command cannot be output to the driving control unit without synchronization due to a second command, which is generated inside a print control device, not being present in another print control device can be reduced.

The print control device according to this aspect of the invention preferably further includes an information processing unit that performs processing to combine information acquired from another print control device through the communication unit and information of the print control device into one piece of combined information and the response unit, upon receiving the information acquisition command, preferably transmits the information stored in the storage unit and the combined information.

According to this aspect of the invention, information relating to components allocated to one print control device and information related to components allocated to another print control device are combined into one piece of combined information. The response unit, upon receiving an information acquisition command, transmits the information stored in the storage unit and the combined information. Therefore, the host control unit does not have to perform processing to collect pieces of information from the individual print control devices into one piece of information.

According to a second aspect of the invention, a printing apparatus is provided that is equipped with a plurality of print control devices, which are allocated with and control printing units on the basis of print data, and is equipped with a driving control unit that controls driving of mechanical printing mechanisms on the basis of commands from the print control devices, the print control devices each being the print control device according to the first aspect of the invention.

The printing apparatus according to this aspect of the invention is equipped with the print control device according to the first aspect of the invention and therefore the same advantages as with the print control device according to the first aspect of the invention can be obtained with this printing apparatus.

According to a third aspect of the invention, an information providing method is provided, the information providing method providing, in a printing apparatus that is equipped with a plurality of print control devices, which are allocated with and control printing units on the basis of print data from a host control unit, and is equipped with a driving control unit that controls driving of mechanical printing mechanisms on the basis of commands from the print control devices, information from the driving control unit to the host control unit. The information providing method includes receiving state information from the driving control unit at periodic or non-periodic time intervals and storing the state information in a storage unit; responding, upon receiving an information acquisition command from the host control unit, by transmitting the state information stored in the storage unit to the host control unit; outputting a first command input from an input unit and a second command generated by a command generating unit inside the print control device to an output unit in the order in which they were acquired by a management unit that manages the commands in the order in which they were acquired; and performing avoidance processing of avoiding a synchronization error that occurs in a synchronization unit, which allows the output units to output a command when it is confirmed that the same command is present in the respective output units of the plurality of print control devices, when a second command is not present in the respective output units of all the plurality of print control devices, the information acquisition command not being input to the management unit. The same advantages can be obtained with this aspect of the invention as with the print control device according to the first aspect of the invention.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
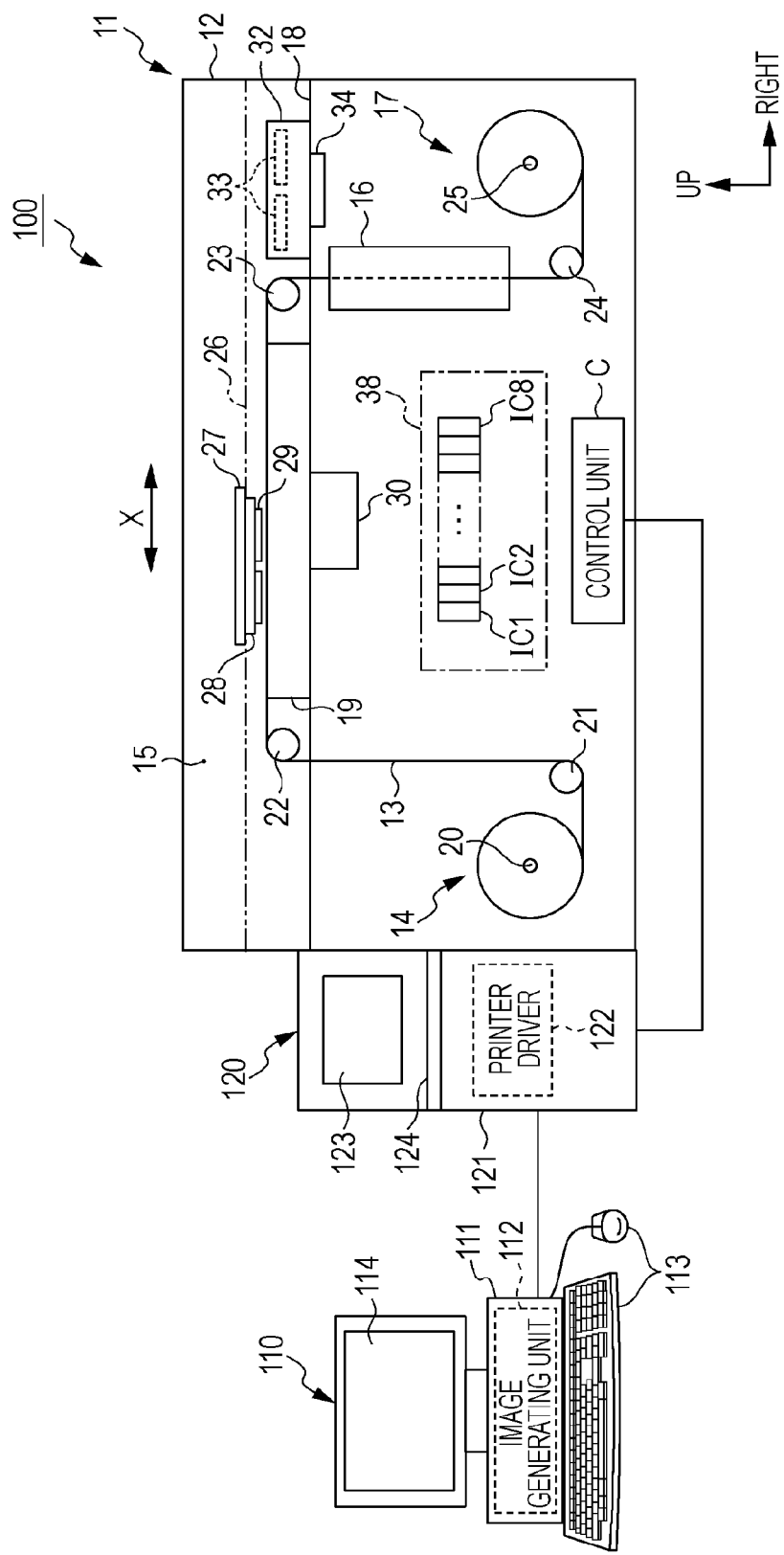
FIG. 1 is a schematic side view of a printing system according to an embodiment.

Hereafter, an embodiment in which the invention is realized as a print control device of a lateral ink jet printer will be described with reference to FIGS. 1 to 10. FIG. 1 is a schematic diagram of a printing system that includes a lateral ink jet printer. As illustrated in FIG. 1, a printing system 100 includes an image-generating apparatus 110 that generates image data, a host apparatus 120 that generates print data on the basis of image data received from the image-generating apparatus 110 and a lateral ink jet printer (hereafter, simply referred to as "printer 11") as an example of a printing apparatus that prints an image on the basis of print data received from the host apparatus 120.

The image-generating apparatus 110 is for example formed of a personal computer and includes an image generating unit 112 which is created by a CPU within a main body 111 of the image-generating apparatus 110 executing image creation software. A user initiates the image generating unit 112 and creates an image on a monitor 114 by operating an input device 113 and then instructs printing of the image by operating the input device 113. Then, the image data of the image is transmitted to the host apparatus 120 via a predetermined communication interface.

The host apparatus 120 is for example formed of a personal computer and includes a printer driver 122, which is created through a CPU within a main body 121 of the host apparatus 120 executing printer driver software. The printer driver 122 generates print data on the basis of image data received from the image-generating apparatus 110 and transmits the print data to a control unit C provided in the printer 11. The control unit C controls the printer 11 on the basis of the print data received from the printer driver 122 and causes the printer 11 to print an image based on the print data. For example, a menu screen for inputting and setting values of control settings in the printer 11 and an image that is to be the target of printing are displayed on a monitor 123.

Next, the configuration of the printer 11 illustrated in FIG. 1 will be described. In the following description in this specification, when the terms "left-right direction" and "up-down direction" are used, they indicate the directions illustrated by the arrows in FIG. 1 and the other drawings. Furthermore, the front and back of FIG. 1 are respectively front and back sides.

As illustrated in FIG. 1, the printer 11 includes a rectangular parallelepiped shaped main case 12. In the main case 12, there are provided a feeding unit 14 that feeds out an elongated sheet 13, a printing chamber 15 in which printing is performed by ejecting ink onto the sheet 13, a drying device 16 that performs a drying process on the sheet 13 to which ink has been made to adhere by printing, and a winding unit 17 that winds up the sheet 13 on which the drying process has been performed.

That is, a plate-shaped base 18, which vertically partitions the inside of the main case 12, is provided at a position somewhat close to the top of the inside of the main case 12. The region above the base 18 forms the printing chamber 15 in which a rectangular plate-shaped supporting member 19 is supported on top of the base 18. In the region below the base 18, the feeding unit 14 is arranged at a position on the left hand side, which is the upstream side in the transport direction of the sheet 13, and the drying device 16 and the winding unit 17 are arranged at positions on the right hand side, which is the downstream side.

As illustrated in FIG. 1, a winding shaft 20 that extends in the front-back direction is provided so as to rotate freely in the feeding unit 14 and the sheet 13 is supported so as to be able to rotate together with the winding shaft 20 in a state of having been wound in advance into a roll around the winding shaft 20. That is, the sheet 13 is fed out from the feeding unit 14 with rotation of the winding shaft 20. In addition, the sheet 13 fed out from the feeding unit 14 is wound around a first roller 21 positioned to the right of the winding shaft 20 and guided upward.

A second roller 22 is provided at a position corresponding to that of the first roller 21 therebelow in the up-down direction to the left of the supporting member 19 so as to be parallel to the first roller 21 therebelow. The sheet 13, whose transport direction has been changed to vertically upward by the first roller 21, is wound around the second roller 22 from below and to the left and thereby has its transport direction changed to the horizontal rightward direction and slides along the upper surface of the supporting member 19.

In addition, a third roller 23 is provided so as to oppose the second roller 22, which is to the left with the supporting member 19 interposed therebetween, and so as to be parallel to the second roller 22. The positions of the second roller 22 and the third roller 23 are adjusted so that the tops of the circumferential surfaces thereof are at the same height as the upper surface of the supporting member 19.

After the sheet 13, whose transport direction has been changed to the horizontal rightward direction by the second roller 22 on the left hand side inside the printing chamber 15, has been transported to the right hand side, which is downstream, while sliding along the upper surface of the supporting member 19, the transport direction of the sheet 13 is changed to the vertically downward direction by being wound around the third roller 23 from above and to the right and the sheet 13 is transported into the drying device 16, which is below the base 18. Then, the sheet 13 having been subjected to a drying process by being passed through the inside of the drying device 16 is again transported in the vertically downward direction and then the sheet 13 is wound around a fourth roller 24, has its transport direction changed to the horizontal rightward direction and is then wound up into a roll as a result of a winding shaft 25 of the winding unit 17 arranged to the right of the fourth roller 24 rotating in accordance with the driving power of a transport motor 61 (refer to FIG. 5).

As illustrated in FIG. 1, a pair of guide rails 26 (illustrated by the two-dot dashed line in FIG. 1), which extend in the left-right direction, are provided in front of and behind the supporting member 19 inside the printing chamber 15. The upper surfaces of the guide rails 26 are higher than the upper surface of the supporting member 19 and a rectangular carriage 27 is supported by the upper surfaces of the guide rails 26 in a state of being able to reciprocate in a main scanning direction X illustrated in FIG. 1 (left-right direction in FIG. 1) along the guide rails 26 in accordance with driving of a first carriage motor 62 (refer to FIG. 5). In addition, the carriage 27 is capable of moving in a sub-scanning direction (front-back direction orthogonal to plane of paper of FIG. 1) in accordance with driving of a second carriage motor 63 (refer to FIG. 5). A plurality of recording heads 29 are supported by a support plate 28 beneath the carriage 27.

A fixed region from the left end to the right end of the supporting member 19 serves as a printing region and the sheet 13 is transported intermittently in units that are the size of this printing region. The carriage 27 reciprocates with respect to the sheet 13, which is stationary on the supporting member 19, and ink is ejected from the recording heads 29, whereby printing is performed on the sheet 13.

While printing is being performed, a suction device 30 provided beneath the supporting member 19 is driven and the sheet 13 is sucked onto the upper surface of the supporting member 19 by the suction force due to the negative pressure extending over a multiplicity of suction holes formed in the upper surface of the supporting member 19. Then, once one lot of printing on the sheet 13 is finished, the negative pressure of the suction device 30 is released and the sheet 13 is transported.

Furthermore, inside the printing chamber 15, a maintenance device 32 for performing maintenance on the recording heads 29 at a time when printing is not being performed is provided in a non-printing region, which is to the right of the third roller 23. The maintenance device 32 includes a cap 33 for each recording head 29 and a raising/lowering device 34. Each of the caps 33 is moved between a capping position at which the cap 33 abuts against a nozzle formation surface 35 (refer to FIG. 2) of the recording head 29 and a retraction position that is spaced apart from the nozzle formation surface 35.

Furthermore, as illustrated in FIG. 1, a plurality of (for example, eight) ink cartridges IC1 to IC8, which respectively accommodate ink of different colors, are removably installed inside the main case 12. Each of the ink cartridges IC1 to IC8 is connected to the recording heads 29 through ink supply channels 70A and 70B (refer to FIG. 3) and each of the recording heads 29 eject ink supplied from the ink cartridges IC1 to IC8. Accordingly, with this example printer 11, color printing using eight colors of ink is possible. An openable/closeable cover 38 is provided at a location corresponding to the arrangement positions of the ink cartridges IC1 to IC8 in the main case 12. The cover 38 is opened when replacing the ink cartridges IC1 to IC8.

The eight ink cartridges IC1 to IC8 for example accommodate inks such as black (K), cyan (C), magenta (M) and yellow (Y) inks. In addition, a configuration can be adopted in which a moisturizer cartridge that accommodates a moisturizer is installed. Of course, the types of ink (number of colors) can be appropriately set and a configuration for monochrome printing using just black ink, or a configuration having ink of two colors or any number of colors of three or more instead of eight can also be adopted.

Each of the ink cartridges IC1 to IC8 is electrically connected to the control unit C through a cartridge holder 69 (refer to FIG. 3) and remaining amount of ink information for the corresponding colors is written into non-volatile memory elements 47 (refer to FIGS. 3 and 5) mounted in the individual ink cartridges IC1 to IC8. In the memory elements 47, in addition to remaining amount of ink information, ink-related information (example of reference information) such as item number, ink color and expiration date are stored.

Figure 2:
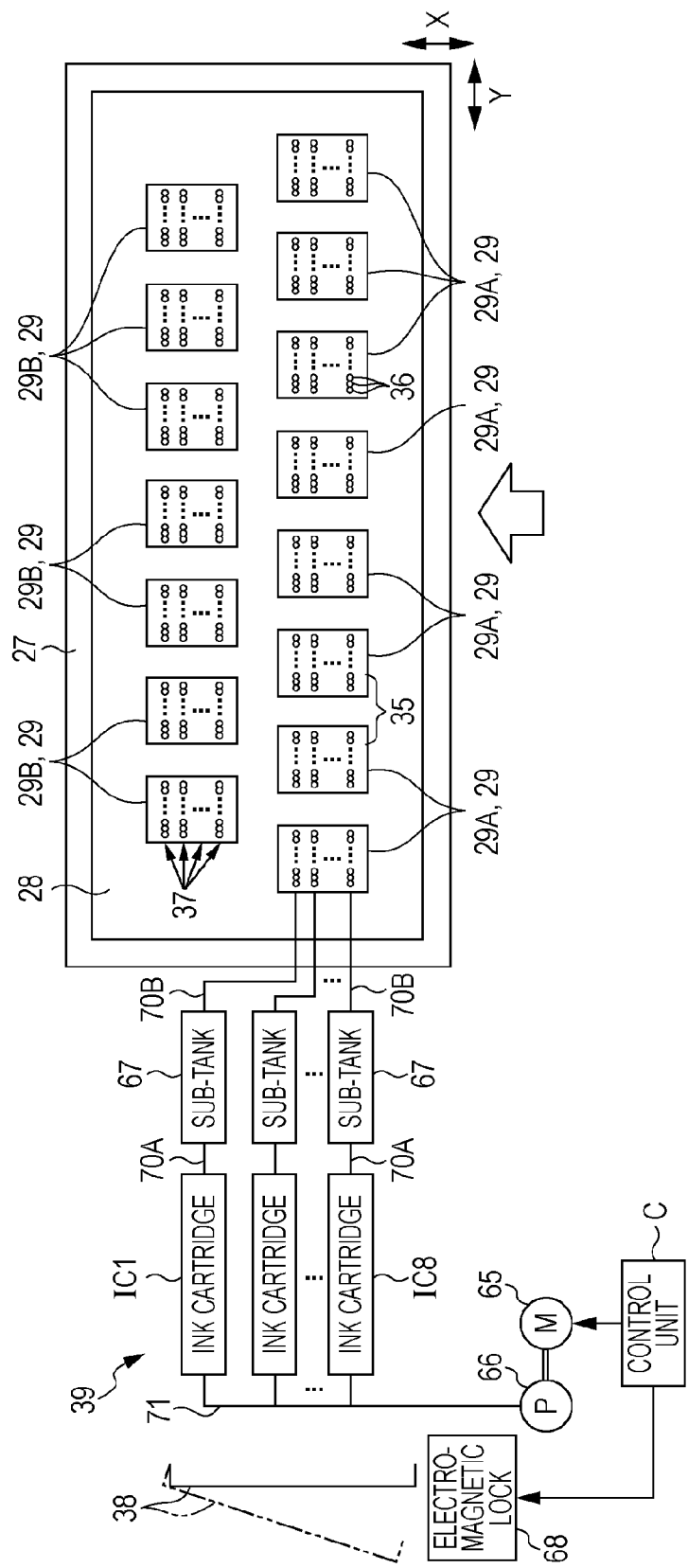
FIG. 2 is a schematic view illustrating the bottom surface of recording heads and an ink supply device.

FIG. 2 is a schematic diagram illustrating a plurality of recording heads provided on the bottom of the carriage and an ink supply device that supplies ink to the individual recording heads. As illustrated in FIG. 2, the plurality of (fifteen in this embodiment) recording heads 29 are supported by the support plate 28, which is supported underneath the carriage 27, in a staggered arrangement pattern in the widthwise direction (front-back direction), which is orthogonal to the transport direction of the sheet 13 (direction indicated by the unfilled arrow in FIG. 2). That is, among the fifteen recording heads 29, recording heads 29A and 29B arranged in two rows at a uniform pitch along the sub-scanning direction Y form a staggered pattern in which the two rows are shifted from one another by half a pitch in the sub-scanning direction Y. In the nozzle formation surfaces 35 forming the lower surfaces of the recording heads 29, a plurality of nozzle rows 37 (eight in this embodiment), in each of which a multiplicity of nozzles 36 are arranged in a row along the front-back direction (sub-scanning direction Y), are formed at predetermined intervals in the main scanning direction X.

As illustrated in FIG. 2, an ink supply device 39 is provided that supplies ink of each color to the individual recording heads 29. The ink supply device 39 includes a pump motor 65, a pressurizing pump 66, the ink cartridges IC1 to IC8, sub-tanks 67 and the cartridge holder 69 (refer to FIG. 3).

The individual ink cartridges IC1 to IC8 are mounted in the cartridge holder 69 and connected to the sub-tanks 67 through respective ink supply channels 70A (for example, tubes) and furthermore the sub-tanks 67 are connected to each of the recording heads 29 through ink supply channels 70B (for example, tubes). In FIG. 2, only the connection relationship between a plurality of sub-tanks (for example, eight) and a single recording head 29 is illustrated. In reality, the same number of ink supply channels 70B as the number of recording heads 29 extend from the eight sub-tanks 67 and the individual ink supply channels 70B are connected to the respective recording heads 29.

Furthermore, the ink cartridges IC1 to IC8, which are mounted in the cartridge holder 69, are connected to a discharge opening of the pressurizing pump 66 through air supply channels 71. As a result of the control unit C driving the pump motor 65, a pumping operation of the pressurizing pump 66 is driven and thereby pressurized air discharged from the pressurizing pump 66 is supplied to pressure chambers inside the ink cartridges IC1 to IC8 through the air supply channels 71.

Furthermore, an electromagnetic lock 68, which is for locking the cover 38 into a closed state, is provided in the main case 12 at a position corresponding to an end of rotation of the cover 38 in a closed state as illustrated by the solid line in FIG. 2. For example, an operation switch (refer to FIG. 5), which is for allowing the user to lock and unlock the cover 38, is provided at a position in the vicinity of the cover 38 in the main case 12. When a lock signal is input from the operation switch 72 when an operation is performed to lock the cover 38, the control unit C causes the cover 38 to be locked in a closed state by exciting the electromagnetic lock 68. Furthermore, when an unlock signal is input from the operation switch 72 when an operation is performed to unlock the cover 38, the control unit C causes the cover 38 to be unlocked by demagnetizing the electromagnetic lock 68. When a cartridge is to be replaced, as illustrated in FIG. 2, at least one of the ink cartridges IC1 to IC8 is replaced while the cover 38 is in an open state illustrated with a two-dot dashed line (the maximum degree of opening is larger than that shown in FIG. 2), the cover 38 is then put back into a closed state illustrated by the solid line in FIG. 2, and then the cover 38 is locked in the closed state by operating the operation switch 72. The method of instructing locking of cover 38 is not limited to the method in which the operation switch 72 is operated and a configuration can be adopted in which the control unit C drives excitation of the electromagnetic lock 68 when a closing detection signal is input from a sensor that detects the cover 38 being placed into a closed state.

Figure 3:
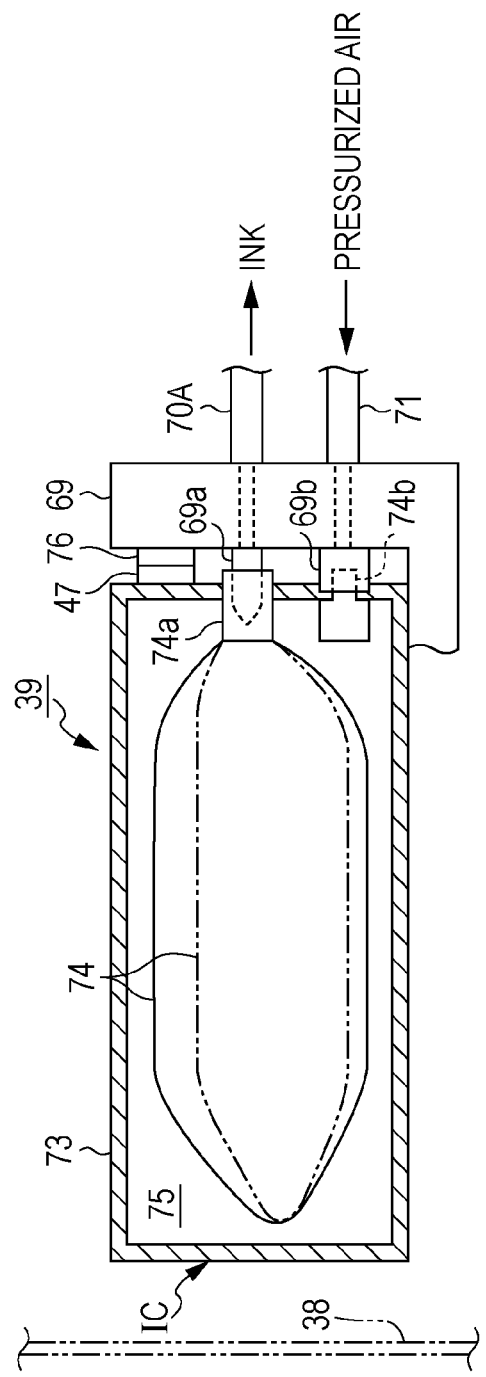
FIG. 3 is a schematic sectional view illustrating essential parts of the ink supply device.

FIG. 3 is a schematic side sectional view illustrating essential parts of an ink supply device. The ink cartridges IC, the ink supply channels 70A and the air supply channels 71 are connected via the cartridge holder 69 illustrated in FIG. 3. In detail, when a supply needle 69a that protrudes from the cartridge holder 69 is inserted into an ink supply portion 74a of an ink pack 74 accommodated in a box-shaped case 73 forming the ink cartridge IC, a valve body (not illustrated in any of the figures) built into the ink supply portion 74a is pushed into the valve opening. As a result, the interior of the ink pack 74 enters a communicative state with the ink supply channel 70A. Furthermore, when an air inlet 74b provided in the ink cartridge IC is inserted into an air supply portion 69b provided in the cartridge holder 69, a valve body (not illustrated in any of the drawings) built into the air supply portion 69b is pushed into the valve opening, whereby a pressure chamber 75 formed between the case 73 and the ink pack 74 enters a communicative state with the air supply channel 71.

As illustrated in FIG. 3, when the ink pack 74 is in a full-of-ink state, as illustrated by the solid line, the volume of the pressure chamber 75 is at a minimum. This minimum volume will be termed an initial volume Ao of the pressure chamber 75 hereafter. As ink is introduced from the ink pack 74 into the ink supply channel 70A, the occupied volume of the ink pack 74 inside the case 73 gradually decreases as illustrated by the two-dot dashed line from the initial state illustrated by the solid line in FIG. 3. Ink corresponding to an amount by which the volume of the ink pack 74 has decreased is supplied to the sub-tank 67 through the ink supply channel 70A and then the ink is supplied from the sub-tank 67 to the corresponding recording head 29 through the ink supply channel 70B. Driving of the pump motor 65 is controlled so that the chamber pressure detected by a pressure sensor (not illustrated), which is capable of detecting the chamber pressure of the pressure chamber 75, falls within a predetermined range. Furthermore, the cartridge holder 69 illustrated in FIG.

3 is provided with terminals 76, which can be electrically connected to the memory element 47 provided on an end surface of the ink cartridge IC in a state of being mounted on the ink cartridge IC.

Figure 4A:
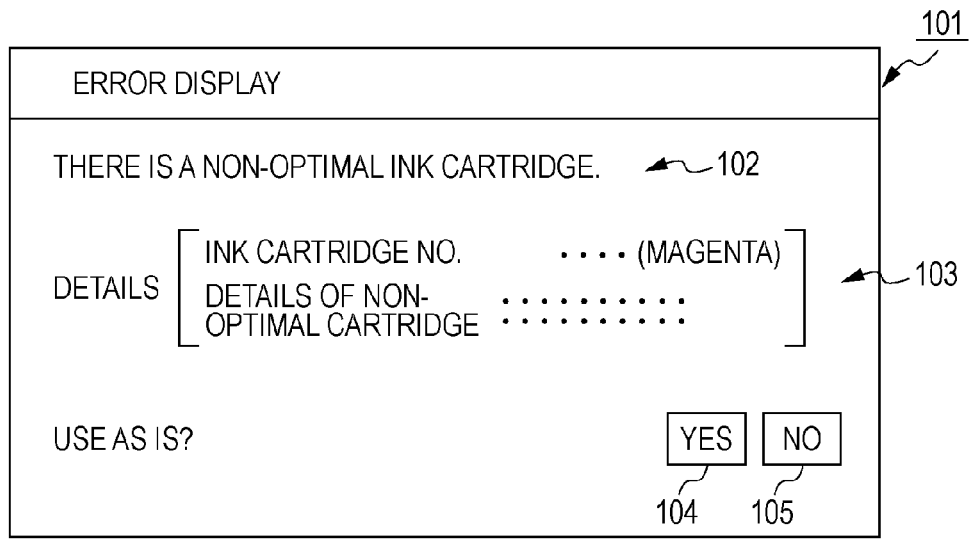
FIGS. 4A and 4B are screen diagrams illustrating error screens.
Figure 4B:
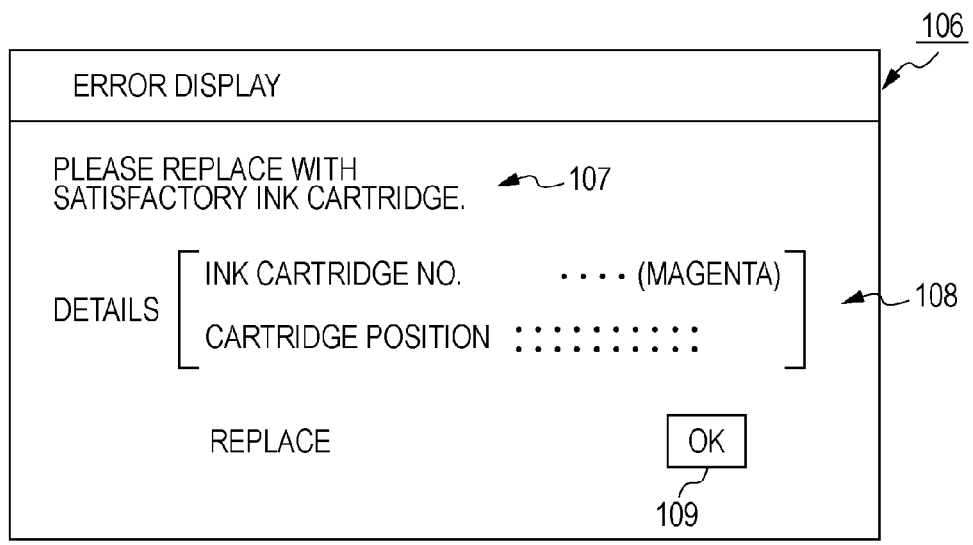
Figure 5:
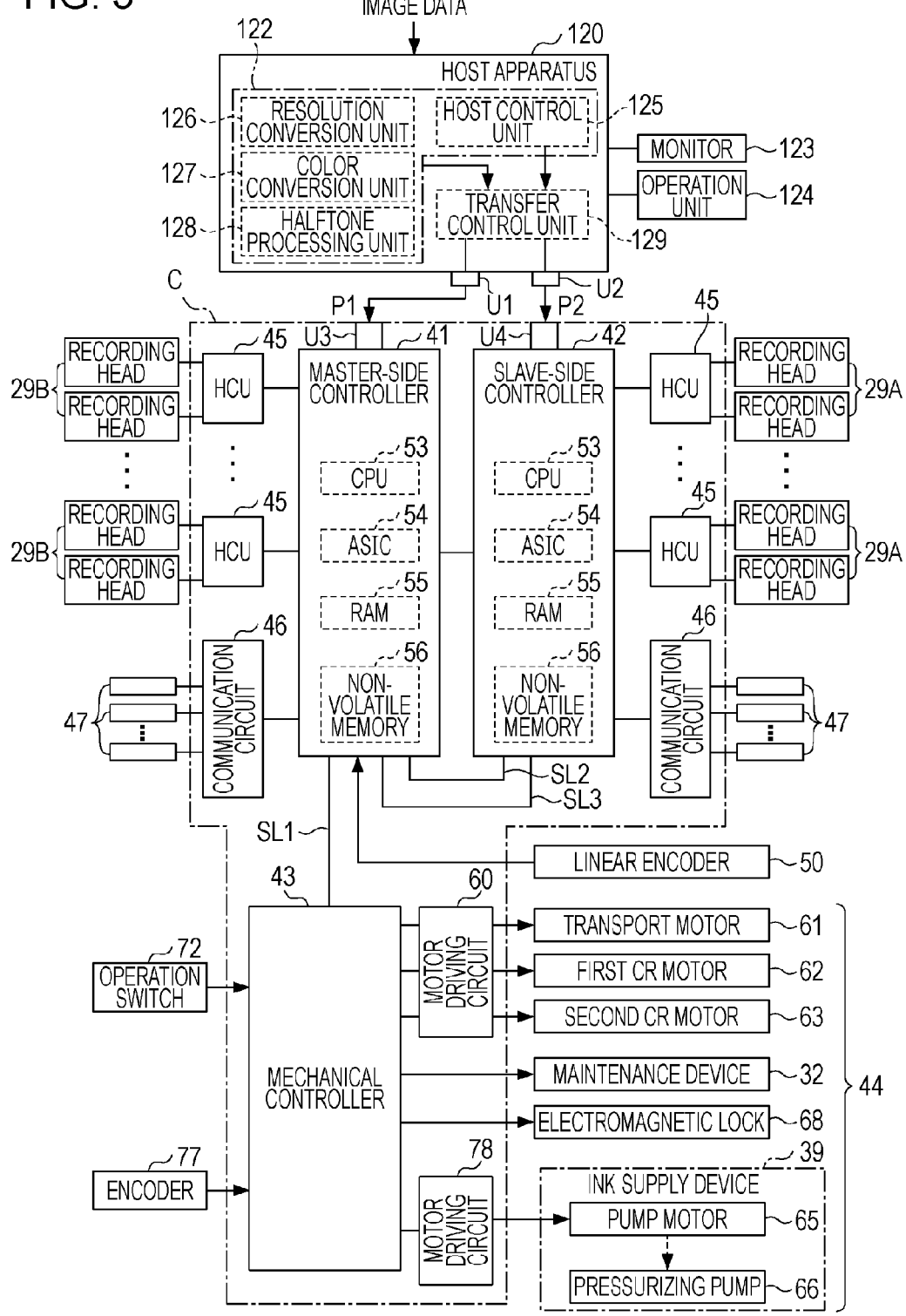
FIG. 5 is a block diagram illustrating the electrical configuration of the printing system.

FIG. 5 is a block diagram illustrating the electrical configuration of the printing system 100. The printer driver 122 within the host apparatus 120 illustrated in FIG. 5 includes a host control unit 125 that controls display of various screens such as a menu screen, a print condition setting screen and an error screen 101 (refer to FIG. 4) to be displayed on the monitor 123 and performs predetermined processing in response to operation signals input from an operation unit 124 for the states displayed on the screens. The host control unit 125 controls the entirety of the printer driver 122. The printer driver 122 further includes a resolution conversion unit 126, a color conversion unit 127 and a halftone processing unit 128, which perform image processing necessary for generating print data for image data ID received from the upper-level image-generating apparatus 110. The resolution conversion unit 126 performs resolution conversion processing to convert the image data ID from the display resolution to the print resolution. The color conversion unit 127 performs color conversion processing to convert colors from the display color space (for example, RGB color space or YCbCr color space) to the color space to be used for printing (for example CMYK color space). Furthermore, the halftone processing unit 128 performs for example halftone processing to convert high-gradation (for example 256 gradations) image data for display into low-gradation (for example, two gradations or four gradations) image data for printing. Then, the printer driver 122 generates print job data (hereafter, simply referred to as "print data PD") by attaching a command written in print control code (for example, ESC/P) to the print image data PI generated as a result of the above image processing.

The host apparatus 120 includes a transfer control unit 129 that controls transferring of data. The transfer control unit 129 sequentially serially transfers print data PD generated by the printer driver 122 to the printer 11 in packets of data of a predetermined size.

The control unit C of the printer 11 includes a pair of controllers 41 and 42 that receive print data PD from the host apparatus 120 and perform various control operations including control of a recording system. The plurality of (fifteen in this embodiment) recording heads 29 are divided into two groups of predetermined numbers of recording heads (seven and eight in this embodiment) and are then allocated to and controlled by the pair of controllers 41 and 42. That is, the controller 41 on the master side is in charge of controlling seven recording heads 29B and the controller 42 on the slave side is in charge of controlling eight recording heads 29A.

The printer driver 122 within the host apparatus 120 illustrated in FIG. 5 generates print data P1 and print data P2 by dividing print image data into two pieces in accordance with the arrangement positions of the recording heads 29 that the two controllers 41 and 42 are in charge of and then attaching the same print language description command to the two pieces of print data obtained by the division.

As illustrated in FIG. 5, the host apparatus 120 of this embodiment includes two serial communication ports U1 and U2. Furthermore, the two controllers 41 and 42 also respectively include serial communication ports U3 and U4. The transfer control unit 129 serially transfers the corresponding print data P1 to the master-side controller 41 through communication between the serial communication ports U1 and U3, and serially transfers the corresponding print data P2 to the slave-side controller 42 through communication between the serial communication ports U2 and U4. The host apparatus 120 transfers the print data P1 and the print data P2 comparatively quickly to the controllers 41 and 42 by performing serial transfer using two lines employing the two serial communication ports U1 and U2. In this embodiment, the serial communication ports U2 and U4 through which commands included in the print data P1 and P2 are input form an example of an input unit.

As illustrated in FIG. 5, a plurality (N (in this example four)) of head control units 45 (hereafter, simply "HCUs 45") are connected to each of the two controllers 41 and 42 and a plurality (M (in this example two)) of recording heads 29 are connected to each HCU 45.

Four, that is, half of the eight memory elements 47 mounted in the eight ink cartridges IC1 to IC8 are connected to the communication circuit 46 connected to the controller 41 and the other four are connected to the other communication circuit 46 connected to the other controller 42. The master-side controller 41 is able to communicate with the memory elements 47 mounted in the four ink cartridges IC1 to IC4 and the slave-side controller 42 is able to communicate with the memory elements 47 mounted in the four ink cartridges IC5 to IC8. The memory elements 47 are formed of non-volatile memory elements (non-volatile memories). A variety of ink-related information, such as the amount of ink remaining, the ink color, expiration date, maintenance information and item number of the corresponding ink cartridge IC, is stored in the memory elements 47. In a state in which the ink cartridges IC (refer to FIGS. 2 and 3) are mounted in the cartridge holder 69, the memory elements 47 and the terminals 76 on the side of the cartridge holder 69 are electrically connected to each other, whereby the communication circuits 46 are connected to the memory elements 47 in a communicative state for performing reading and writing to and from the memory elements 47.

The master-side controller 41 manages information on the amounts of ink remaining in the four ink cartridges IC1 to IC4 and the slave-side controller 42 manages information on the amounts of ink remaining in the four remaining ink cartridges IC5 to IC8. The master-side controller 41 is capable of reading and writing ink-related information by communicating with the respective memory elements 47 of the ink cartridges IC1 to IC4 through the corresponding communication circuit 46. Similarly, the slave-side controller 42 is capable of reading and writing ink-related information by communicating with the memory elements 47 mounted in the ink cartridges IC5 to IC8 through the corresponding communication circuit 46.

Furthermore, the control unit C includes a mechanical controller 43 that is connected to the output side (downstream side in flow of control) of the master-side controller 41 through a communication line SL1. The mechanical controller 43 governs control of mechanical mechanisms 44 mainly including those of the transport system and the carriage drive system. At a stage at which the master-side controller 41 has been able to prepare the seven recording heads 29B that it is in charge of to be ready for printing (that is, has prepared print image data to be used in control of ink droplet ejection) and at which the slave-side controller 42 has also been able to prepare the eight recording heads 29A that it is in charge of to be ready for printing, the master-side controller 41 transmits a carriage initiation command to the mechanical controller 43. This ensures that ejection misses are prevented from occurring, in which ink droplets are not ejected despite the recording heads 29 having reached the ejection positions due to the carriage 27 being initiated before all of the print preparation operations being performed by the controllers 41 and 42 have finished.

Furthermore, at a stage at which the master-side controller 41 has finished printing using the seven recording heads 29B that it is in charge of and at which the slave-side controller 42 has finished printing using the eight recording heads 29A that it is in charge of, the master-side controller 41 transmits a transport command, which instructs transporting of the sheet 13, to the mechanical controller 43. This ensures that deviation of the impact positions of the ink droplets ejected from the recording heads 29 on the sheet 13 (print position deviation), due to transporting of the sheet 13 being started (or suction of the sheet onto the supporting member 19 being released) at a stage before both of the controllers 41 and 42 has finished printing, is prevented from occurring. Thus, the master-side controller 41 has a function of transmitting commands in synchronization with the progress of the slave-side controller 42. The two controllers 41 and 42 are divided into a slave-side controller that outputs commands to the other controller and a master-side controller that outputs commands to the mechanical controller 43 once it is checked that a command received from the slave-side controller and its own command are both present and that the contents of the commands match. In this embodiment, the mechanism components for attaining synchronization from the viewpoint of control are different on the master side and the slave side.

As illustrated in FIG. 5, a linear encoder 50 is connected to the master-side controller 41. The linear encoder 50 is provided along the movement path of the carriage 27 and a detection signal (encoder pulse signal), which has a number of pulses proportional to the movement distance of the carriage 27, is input to the master controller 41 from the linear encoder 50. The encoder pulse signal input to the master-side controller 41 is transmitted to the slave-side controller 42 through a signal line SL2 connected between the two controllers 41 and 42. Furthermore, the master-side controller 41 and the slave-side controller 42 are connected to each other through a communication line SL3 used for synchronization processing.

As illustrated in FIG. 5, the controllers 41 and 42 each include a CPU (central processing unit) 53, an ASIC (application specific IC (integrated circuit for a specific application)) 54, a RAM 55 and a non-volatile memory 56. The CPU 53 executes various tasks necessary to control printing by executing programs stored in the non-volatile memory 56. Furthermore, the ASIC 54 performs data processing for the recording system such as processing of print data.

On the other hand, the transport motor 61, the first carriage motor (hereafter, "first CR motor 62") and the second carriage motor (hereafter, "second CR motor 63"), which are some of the mechanical mechanisms 44, are each connected to the mechanical controller 43 via a motor driving circuit 60. Furthermore, the maintenance device 32 and the electromagnetic lock 68 are each connected to the mechanical controller 43. Furthermore, the pump motor 65, which constitutes part of the ink supply device 39, is connected to the mechanical controller 43 via a motor driving circuit 78 and the pressurizing pump 66 is driven by the pump motor 65 being driven.

In addition, the above-described operation switch 72 and a transport system encoder 77 are each connected to the mechanical controller 43 as input systems. When a lock operation signal is input from the operation switch 72, the mechanical controller 43 excites the electromagnetic lock 68 and when an unlock operation signal is input from the operation switch 72, the mechanical controller 43 demagnetizes the electromagnetic lock 68. In accordance with various commands received from the master-side controller 41 via the communication line SL1, the mechanical controller 43 controls driving of the motors 61 to 63 and 65, driving of the maintenance device 32 and driving of the electromagnetic lock 68.

The control unit C, at the time of printing, performs a transport operation by driving the transport motor 61 to transport the sheet 13 until the next region to be printed is positioned on the supporting member 19, a suction operation to cause the next region to be printed to be sucked to the supporting member 19 after transporting the sheet 13, a printing operation of performing printing on the sheet 13 with the recording heads 29 and a suction release operation to release the suction once one lot of printing (one page) has been completed. At this time, the printing operation is carried out by ejecting ink droplets from the recording heads 29 while the carriage 27 is moved in the main scanning direction X. The printing operation is performed by moving the carriage 27 one time (one pass operation) in the main scanning direction X by driving the first CR motor 62 and by moving the carriage 27 in the sub-scanning direction Y by driving the second CR motor 63 after each one pass has finished, and repeating these operations a predetermined number of times.

Figure 6:
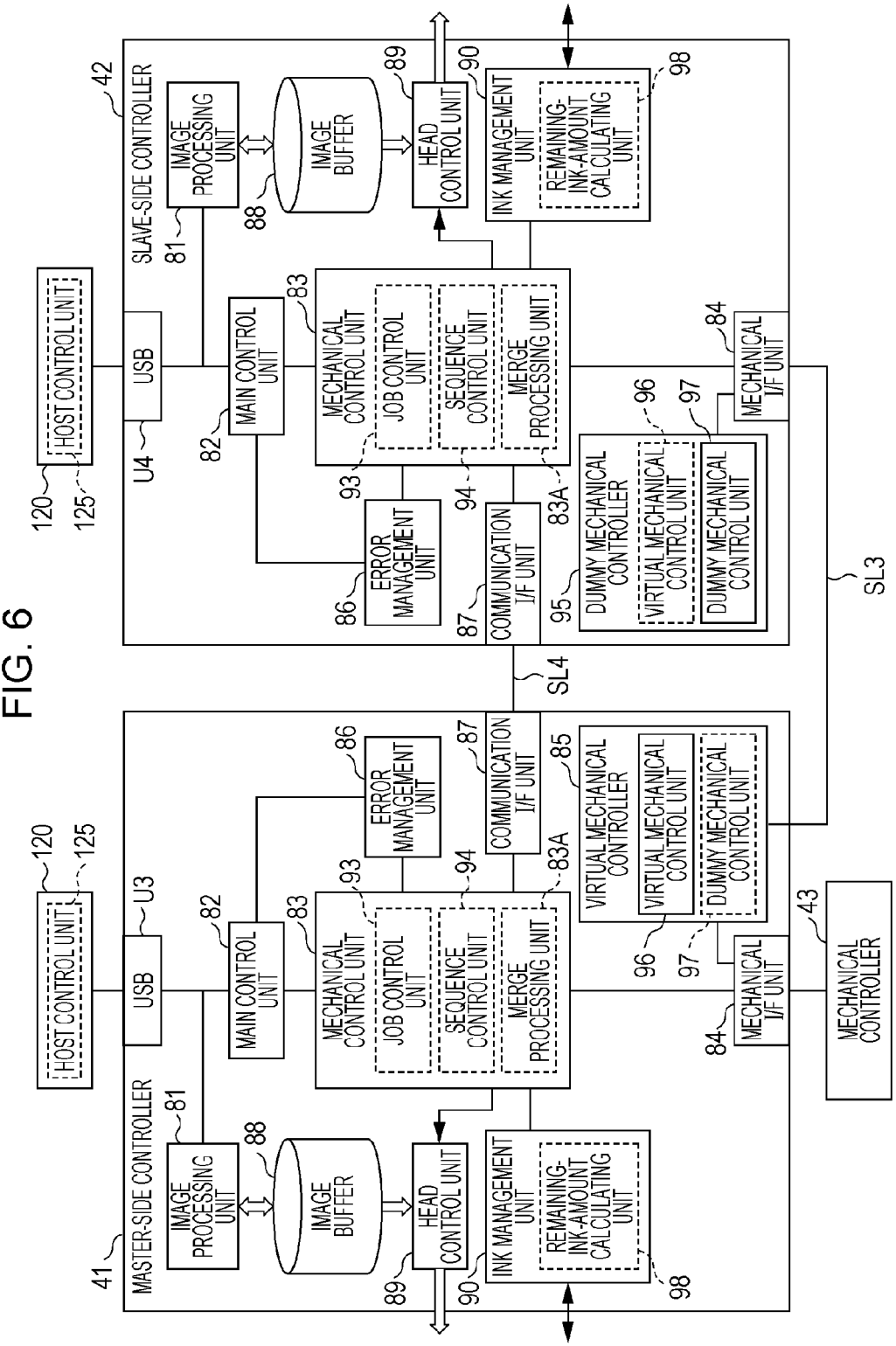
FIG. 6 is an explanatory block diagram of the configurations of a master controller and a slave controller.

FIG. 6 is a block diagram for explaining the functional configurations of the master-side controller 41 and the slave-side controller 42. As illustrated in FIG. 6, the two controllers 41 and 42 have symmetrical configurations. This is because each of the controllers 41 and 42 on the master and slave sides can be realized using the same program configuration. Since symmetrical configurations are adopted (substantially the same functional configuration), hereafter, the configuration of the master-side controller 41 will be described and parts of the functional configuration of the slave-side controller 42 that differ from this will be described.

As illustrated in FIG. 6, the master-side controller 41 includes the serial communication port U3, as an example of an input unit, an image processing unit 81, a main control unit 82, a mechanical control unit 83, a mechanical I/F unit 84, as an example of an output unit, and a virtual mechanical controller 85, as an example of a synchronizing unit. The master-side controller 41 further includes an error management unit 86, a communication I/F unit 87, an image buffer 88, a head control unit 89 and an ink management unit 90, which is an example of a detection unit. On the other hand, the slave-side controller 42 has the same configuration as the master-side controller 41 but includes a dummy mechanical controller 95 instead of the virtual mechanical controller 85. The main control unit 82 has a function of controlling the individual units 83 to 90 in an integrated manner.

Furthermore, the mechanical I/F unit 84 of the slave-side controller 42 is connected to the virtual mechanical controller 85 of the master-side controller 41 through the communication line SL3. That is, in contrast to the mechanical I/F unit 84 of the master-side controller 41 being connected to the actual mechanical controller 43, the mechanical I/F unit 84 of the slave-side controller 42 is connected to the virtual mechanical controller 85 provided inside the master-side controller 41. The mechanical I/F unit 84 on the slave side intends to output commands to the mechanical controller 43 but actually transmits commands to the virtual mechanical controller 85.

The image processing unit 81 of the master-side controller 41 illustrated in FIG. 6 performs image processing such as decompression processing, command analysis, microweave processing and aspect conversion processing on print data P1 input through the serial communication port U3. On the other hand, the image processing unit 81 of the slave-side controller 42 illustrated in FIG. 6 performs image processing such as decompression processing, command analysis, microweave processing and aspect conversion processing on print data P2 input through the serial communication port U4.

The image processing unit 81 temporarily stores decompressed print data in the image buffer 88. Here, the print data P1 includes print image data and print language description commands. The main control unit 82 retrieves control commands by analyzing the print language description commands within the decompressed print data P1 and transmits the retrieved commands to the mechanical control unit 83. The image processing unit 81 sequentially performs necessary image processing such as allocation processing (microweave processing) of allocating dots of print image data to nozzles and aspect conversion processing and generates head control data used in controlling the recording heads 29 and stores the head control data in the image buffer 88. In addition, the main control unit 82 of this embodiment also functions as an example of a response unit. That is, the main control unit 82 receives device state information US (refer to FIG. 10) from the mechanical controller 43 and temporarily stores the device state information US, and then when the main control unit 82 receives a device state acquisition command SG (refer to FIG. 10) from the host control unit 125, the main control unit 82 transmits the previously stored device state information US to the host control unit 125 as a response. The details of this function of the main control unit 82 will be described below.

The head control unit 89 reads out head control data from the image buffer 88 and divides the head control data into pieces for the individual recording heads 29 and allocates and transfers the data to the respective HCUs 45. Furthermore, the HCUs 45 sequentially transmit the corresponding head control data to the recording heads 29. A head driving circuit (not illustrated) within each of the recording heads 29 controls driving of ejection driving elements of all the nozzles 36 on the basis of the head control data and causes ink droplets to be ejected from the nozzles 36. At this time, the head control unit 89 generates an ejection timing signal on the basis of an encoder pulse signal input from the linear encoder 50 and the head driving circuit drives the ejection driving elements on the basis of the ejection timing signal.

The mechanical control unit 83 illustrated in FIG. 6 transmits a command received from the main control unit 82 to the mechanical I/F unit 84. At this time, in the case where the received command is a sequence command, the mechanical control unit 83 for example monitors the progress of the processing of the head control unit 89 and at a stage where all head control data to be used in the next pass of printing is present and print preparation has been able to have been performed, the mechanical control unit 83 transmits this sequence command to the mechanical I/F unit 84. Other commands are transmitted to the mechanical I/F unit 84 at suitable times in accordance with the types of commands.

Upon receiving a command from the mechanical control unit 83, the mechanical I/F unit 84 queries the virtual mechanical controller 85. Then, upon receiving an ACK signal (acknowledgment signal) from the virtual mechanical controller 85 as a response to the query, the mechanical I/F unit 84 transmits the command to the mechanical controller 43. That is, if the mechanical I/F unit 84 has not yet received an ACK signal as a response to the query made to the virtual mechanical controller 85, the mechanical I/F unit 84 waits until it receives an ACK signal, and then once an ACK signal has been received, the mechanical I/F unit 84 transmits the command to the mechanical controller 43. However, in the case where a timeout occurs due to the waiting time waited for a response (ACK signal) reaching a predetermined time period, a retry request is transmitted to the mechanical control unit 83.

The image processing unit 81, the main control unit 82, the mechanical control unit 83 and the mechanical I/F unit 84 of the slave-side controller 42 perform the same processing. However, the dummy mechanical controller 95 has a different function from that of the virtual mechanical controller 85. When the dummy mechanical controller 95 receives a query from the mechanical I/F unit 84, the dummy mechanical controller 95 unconditionally immediately responds with an ACK signal. Accordingly, when the mechanical I/F unit 84 of the slave-side controller 42 receives a command from the mechanical control unit 83 and queries the dummy mechanical controller 95, the mechanical I/F unit 84 immediately receives an ACK signal from the dummy mechanical controller 95 and therefore outputs the command without waiting for substantially any time after receiving the command.

In contrast, upon receiving a command query from the master-side mechanical I/F unit 84, the master-side virtual mechanical controller 85 responds with an ACK signal to each mechanical I/F unit 84 under the condition that a command that was able to be transmitted from the slave-side mechanical I/F unit 84 through the communication line SL3 and that the two commands (that is, the master-side command and the slave-side command) match each other. Accordingly, the master-side mechanical I/F unit 84 waits for a response for when it has been determined that commands from both mechanical I/F units 84 on the master and slave sides are present in the virtual mechanical controller 85 and that the present commands match, and when such a response is received, outputs the commands to the mechanical controller 43. Consequently, commands can be transmitted to the mechanical controller 43 in synchronization between the controllers 41 and 42 on the master and slave sides.

As illustrated in FIG. 6, the virtual mechanical controller 85 and the dummy mechanical controller 95 have the same configuration and each include a virtual mechanical control unit 96 and a dummy mechanical control unit 97. When initiated, the virtual mechanical control unit 96 functions as the virtual mechanical controller 85 and when initiated, the dummy mechanical control unit 97 functions as the dummy mechanical controller 95. Which of the virtual mechanical control unit 96 and the dummy mechanical unit 97 is to be initiated is decided by the main control unit 82 judging whether it is on the master or slave side. In the case where the main control unit 82 judges it is the on the master side, the virtual mechanical control unit 96 is made available and initiated and the dummy mechanical control unit 97 is made unavailable and is not initiated. In the case where the main control unit 82 judges it is the on the slave side, the dummy mechanical control unit 97 is made available and initiated and the virtual mechanical control unit 96 is made unavailable and is not initiated.

Furthermore, upon receiving a command from the mechanical controller 43, the master-side mechanical I/F unit 84 illustrated in FIG. 6 transmits the command to the virtual mechanical controller 85. The virtual mechanical controller 85 transmits the command received from the master-side mechanical I/F unit 84 to the slave-side mechanical I/F unit 84, and then the virtual mechanical controller 85 responds with an ACK signal to the master-side mechanical I/F unit 84. When this response (ACK signal) is received from the virtual mechanical controller 85, the master-side mechanical I/F unit 84 transmits the command to the upper-level mechanical control unit 83. In this embodiment, an input function component that inputs a command from the mechanical controller 43 within the mechanical I/F unit 84 also forms an example of an input unit. In this embodiment, examples of a "first command" include commands input to the serial communication ports U3 and U4 from the host control unit 125 in form of being included in print data, commands generated by the host control unit 125 separately from the print data and input to the serial communication ports U3 and U4, and commands input to the mechanical I/F unit 84 from the mechanical controller 43.

In the case where a command from the master side and a command from the slave side are not both present in the synchronization processing in the virtual mechanical controller 85, since the master-side mechanical I/F unit 84 cannot receive an ACK signal from the virtual mechanical controller 85, a timeout occurs when the waiting time reaches the predetermined time. Meanwhile, since the mechanical I/F unit 84 of the slave-side controller 42 also cannot receive an ACK signal from the virtual mechanical controller 85, a timeout occurs when the waiting time reaches the predetermined time. In this case, the mechanical I/F unit 84 issues a retry request to the mechanical control unit 83. Upon receiving the retry request, the mechanical control unit 83 re-transmits (re-issues) the command to the mechanical I/F unit 84.

The communication I/F units 87 are provided to perform communication in order to synchronize processing between the respective head control units 89 on the master and slave sides and in order for the respective ink management units 90 to exchange information (detection results, amounts of ink consumed, etc.) with each other. In this embodiment, each of these communication I/F units 87 is also used to transmit some commands to the other controller.

The ink management units 90 illustrated in FIG. 6 each include a remaining-ink-amount calculating unit 98. The remaining-ink-amount calculating unit 98 acquires the amounts of consumed ink for the eight colors of ink consumed by approximately half the recording heads 29B (or 29A). Here, each of the head control units 89 counts for each color the number of dots corresponding to the number of times ink ejection is performed by the recording heads 29B (or 29A) on the basis of the print image data. The remaining-ink-amount calculating unit 98 acquires the number of dots for each color of ink from the head control unit 89, totals the acquired numbers of dots for the individual colors, and calculates the amounts of consumed ink for the individual colors of ink consumed by the recording heads 29B (recording heads 29A on the slave side) on the basis of the totaled numbers of dots of the individual colors. In this way, the remaining-ink-amount calculating unit 98 on the master side calculates the amounts of ink consumed for the individual colors by the seven recording heads 29B and the remaining-ink-amount calculating unit 98 on the slave side calculates the amounts of ink consumed for the individual colors by the eight recording heads 29A.

In this embodiment, the ink cartridges IC1 to IC8 of the plurality of colors are managed by being allocated to the master-side controller 41 and the slave-side controller 42. Thus, a configuration is adopted in which the amounts of consumed ink of the eight colors consumed by the recording heads 29B (recording heads 29A on the slave side) on the side of the corresponding controller calculated by the remaining-ink-amount calculating unit 98 are transmitted to the controller on the other side by communication between the respective communication I/F units 87.

Then, the ink management unit 90 reads out ink-related information including the information on the remaining amounts of ink from the memory elements 47 at the time of initiation of the power supply of the printer 11 (at time of initialization operation) and writes the ink-related information into a predetermined storage region of the RAM. In addition, when a predetermined operation finishes in which ink has been consumed in the printer 11, the ink management unit 90 transmits information on the amounts of ink consumed to the ink management unit 90 on the other side via the mechanical control units 83 and the communication I/F units 87 during a predetermined period such as when the cover 38 is closed (that is, when there is a possibility that a cartridge has been replaced). Then, the remaining-ink-amount calculating unit 98 adds on a color-by-color basis the amounts of consumed ink of the eight individual colors consumed by the recording heads 29A managed by and received from the other side and the amounts of consumed ink of the same eight individual colors consumed by the recording heads 29B that its own side is in charge of, in order to calculate the respective amounts of ink consumed for the eight colors consumed by all of the recording heads 29A and 29B. Furthermore, the remaining-ink-amount calculating unit 98 subtracts the respective amounts of consumed ink of the eight colors from the previous remaining amounts of ink of the eight colors and thereby calculates the current remaining amounts of ink of the eight colors. Thus, the remaining-ink-amount calculating unit 98 obtains information on the current remaining amounts of ink for the ink cartridges IC1 to IC4 managed by its own side and also information on the current remaining amounts of ink for the ink cartridges IC5 to IC8 managed by the other side. Information on the current remaining amounts of ink for all the ink cartridges IC1 to IC8 is temporarily stored in a predetermined storage area of the RAM 55. Then, when a predetermined operation finishes in which ink has been consumed, the ink management unit 90 reads out information on the current remaining amounts of ink from the RAM 55 and writes this information into the non-volatile memory 56 and the memory elements 47 when the power supply is turned off when the power supply switch (not illustrated) is turned off.

The ink management unit 90 performs an ink cartridge checking process (hereafter, referred to as "IC checking process") in which various detection processes are performed on the ink cartridges IC on the basis of the ink-related information read out from the memory elements 47 of the ink cartridges IC and the predetermined storage region of the RAM 55. A process of detecting a non-optimal cartridge, which will be described below, is also included in the IC checking process.

This IC checking process is performed during a predetermined period such as when the power supply of the printer 11 is turned on and when the cover 38 is closed (that is when there is a possibility that a cartridge has been replaced). In particular, in the ink supply device 39 of this embodiment, when the cover 38 has been opened, fluid channels between the ink cartridges IC and the sub-tanks 67 are blocked by closing of the electromagnetic openable/closeable valves, which are not illustrated, and it is thus possible to open the cover 38 and replace an ink cartridge IC even when a printing operation is in progress. Thus, since there is a possibility of the remaining amounts of ink changing between before and after opening and closing of the cover 38, it is ensured that calculation of the consumed amounts of ink and calculation of the remaining amounts of ink are performed after the cover 38 has been closed. Calculation of the consumed amounts of ink and calculation of the remaining amounts of ink may also be performed when the power supply of the printer 11 is initiated by the IC checking process (detection process) being performed.

The mechanical controller 43 manages the open/closed state of the cover 38 using a flag on the basis of a detection signal of sensor, which is not illustrated, that can detect the excited/demagnetized state of the electromagnetic lock 68 or the open/closed state of the cover 38 and grasps that the cover 38 has been closed on the basis of a value of this flag. For example, upon detecting that the flag used to manage the open/closed state of the cover 38 has changed from the value of an open state to the value of a closed state and that the cover 38 has been closed, the mechanical controller 43 transmits a cover closed notification (cover closed notification command) to the mechanical control unit 83. The mechanical control unit 83 transmits the received cover closed notification to the ink management unit 90. Upon receiving the cover closed notification, the ink management unit 90 performs the IC checking process. Another reason for the cover closed notification being used as a trigger to initiate the IC checking process is that a configuration is adopted in which writing into the memory elements 47 is permitted when the cover 38 is in a closed state.

When performing the IC checking process, the ink management unit 90 first reads the latest ink-related information by accessing the memory elements 47 or the predetermined region of the RAM. Then, the ink-management unit 90 performs the IC checking process by using the read ink-related information and setting information stored in advance in the non-volatile memory 56. Here, the setting information includes for example information indicating a correspondence relationship between a cartridge position number and an ink color, an ink end threshold value (setting value), a near end threshold value (setting value) and determination information used in a process of detecting a non-optimal cartridge.

The ink management unit 90 performs an ink end detection process by for example determining whether or not the amount of remaining ink calculated by the remaining-ink-amount calculating unit 98 is less than the ink end threshold value. In this ink end detection process, in the case where the remaining amount of ink is less than the ink end threshold value, end of ink is detected. Furthermore, in the IC checking process, a mounting failure detection process of detecting failure of mounting an ink cartridge and an incorrect color detection process of detecting mounting of an ink cartridge of an incorrect color are performed.

The ink management unit 90 detects failure of mounting an ink cartridge IC by determining whether or not the corresponding memory element 47 can be accessed through the communication circuit 46. Then, when there is an ink cartridge IC whose memory element 47 cannot be accessed, the ink management unit 90 detects failure of mounting that ink cartridge IC.

The ink management unit 90 reads out ink color information from the memory elements 47 of ink cartridges IC that are connected at mounting positions corresponding to the respective cartridge position numbers set for the mounting positions (ink supply needles) in the cartridge holder. On the basis of this ink color information, the ink management unit 90 performs a process of detecting an incorrect color ink cartridge IC by referring to the information indicating the correspondence relationship between the cartridge position number and ink color and determining whether or not this ink color information matches the ink color corresponding to the cartridge position number. In the case where the ink color information does not match the ink color corresponding to the cartridge position number, the ink management unit 90 detects that there is an ink cartridge of an incorrect color.

Furthermore, the ink management unit 90 performs a non-optimal cartridge detection process (hereafter, also referred to as "non-optimal IC detection process") (detection process) of detecting a non-optimal ink cartridge from among the ink cartridges IC1 to IC8 as one detection item within the IC checking process. That is, the ink management unit 90 performs the non-optimal IC detection process of detecting a non-optimal ink cartridge by determining whether the ink cartridges IC that are targets of management are satisfactory ink cartridges (hereafter, also referred to as "satisfactory cartridges") or non-optimal ink cartridges (hereafter, also referred to as "non-optimal cartridges") on the basis of the ink-related information. Here, the term "non-optimal cartridge" refers to an ink cartridge that can be used in printing in the printer 11 but is not optimal (not recommended) from the viewpoint of securing print quality. Furthermore, the term "satisfactory cartridge" refers to a satisfactory ink cartridge that is recommended to secure print quality. For example, an ink cartridge IC whose expiration date has passed is a non-optimal cartridge. Since it is possible that ink whose expiration date has passed will have thickened somewhat and this tends to cause clogging of nozzles to easily occur, in the case where high print quality is required, it is preferable that the user replace such an ink cartridge with one whose expiration date has not passed. In this embodiment, ink cartridges with which printing cannot be performed due to for example exhaustion of ink are referred to as "non-usable cartridges" so as to be distinguished from "non-optimal cartridges" with which printing can be performed.

A process of detecting passing of an expiration date in the non-optimal cartridge detection process is performed as follows. If a calculation unit (not illustrated) of the ink management unit 90 compares the "expiration date" acquired from the ink-related information and the current date managed by a real time clock (RTC), which is not shown, and the current date is after the expiration date, then the calculation unit determines that the expiration date has passed. In the case where it is determined that the expiration date has passed, the ink cartridge is detected as a non-optimal ink cartridge.

Furthermore, in the case where a print target has been set for which it is necessary to perform printing using special ink colors such as for logo marks, an ink cartridge having regular ink colors and not the special ink colors would be a non-optimal cartridge. In this case, provided that the area of the reproducible color space is comparatively large, the special colors could be roughly reproduced even when regular inks are used, but it is preferable to replace the ink cartridge with an ink cartridge having the special colors in cases where it is necessary to accurately output the special colors.

In the case where special colors have been set for the ink colors, which is one of the pieces of print condition information, the ink management unit 90 reads out ink color information from the memory elements 47 of the ink cartridges IC actually mounted at the mounting positions of cartridge position numbers at which ink cartridges having ink colors of the same hue as the special colors should be mounted. Then, the ink management unit 90 performs a special color detection process by determining whether or not the read colors are the set special colors. In the case where the actual ink colors do not match the set special colors, the ink management unit 90 detects that the ink cartridge is a non-optimal ink cartridge. Since the ink supply device 39 of this embodiment has a function of being able to completely replace ink within the ink supply channels 70A and 70B and the sub-tanks 67, a configuration is adopted in which even when an ink cartridge is replaced with an ink cartridge IC of a different color, mixing of inks from before and after the replacement does not occur.

The ink management unit 90 transmits the results of the IC checking process (detection results) to the mechanical control unit 83. The mechanical control unit 83 transmits the results of the IC checking process (detection results) received from the ink management unit 90 to the mechanical control unit 83 of the controller on the other side through communication via the communication line SL4 between the communication I/F units 87 of the controllers 41 and 42. In this embodiment, a configuration is adopted in which when the IC checking process is performed, basically the previously described ink consumption amount calculation is also performed. Consequently, the mechanical control unit 83 instructs the communication I/F unit 87 to transmit the results of the IC checking process, the amounts of ink consumed and the latest amounts of ink remaining to the mechanical control unit 83 of the controller on the other side. Thus, in this embodiment, when exchanging information on the amounts of ink consumed in the recording heads 29 managed on the other side by communication through the communication line SL4, the controllers 41 and 42 transmit the results of the IC checking process (detection results) to the controller on the other side by employing communication between the communication I/F units 87.

As illustrated in FIG. 6, the mechanical control unit 83 includes a merge processing unit 83A, a job control unit 93 that controls the order in which commands are executed and a sequence control unit 94 that performs sequence control by receiving commands output in an order controlled by the job control unit 93 and controlling the timing at which these commands are then output. The merge processing unit 83A performs merge processing to merge (combine) detection results of the master-side ink management unit 90 and detection results of the slave-side ink management unit 90 received from the slave-side controller 42. In this embodiment, the job control unit 93 and the sequence control unit 94 form an example of a management unit.

If at least one combination of the detection results of the respective ink management units 90 is abnormal (NG), the merge processing unit 83A produces a merge result of abnormal (NG) and if the detection results of the respective ink management units 90 are all normal (OK), the merge processing unit 83A produces a merge result of normal (OK). The merge processing unit 83A for example manages abnormal (NG) as "0" and manages normal (OK) as "1" and performs merge processing by performing AND operations on the respective detection results of the ink management units 90 on the master and slave sides. The merge processing unit 83A performs merge processing for each non-usable cartridge detection item such as exhaustion of ink, failure of mounting of an ink cartridge, or mounting of an ink cartridge of the wrong color in the IC checking process. The mechanical control unit 83 generates a NG state command (abnormal state command) when the result of the merge processing, that is the detection result, is an abnormal state (NG state) and generates an OK state command (normal state command) when the detection result is a normal state (OK state). In this embodiment, regarding a non-optimal cartridge detection result, in order to ask the user whether to use a non-optimal ink cartridge as is, this detection result (more precisely, state notification command (NG state command)) is transmitted to the host control unit 125 and therefore merge processing accompanying communication between the controllers 41 and 42 through the communication line SL4 is not performed. Of course, merge processing may be performed for non-optimal cartridge detection results.

A non-optimal cartridge is an ink cartridge with which printing can be performed, but which is not recommended from the viewpoint of print quality. Accordingly, in this embodiment, a configuration is adopted in which, in the case where a non-optimal cartridge has been detected, the user is prompted to choose whether to use the non-optimal cartridge as is or to replace the non-optimal cartridge with a satisfactory cartridge. In the case where the detection result is that a non-optimal cartridge has been detected, the respective mechanical control units 83 of the controllers 41 and 42 notify the host control unit 125 of the host apparatus 120 of the non-optimal cartridge (non-optimal cartridge error). If the host control unit 125 illustrated in FIG. 6 receives a notification of a non-optimal cartridge error from the controllers 41 and 42, the host control unit 125 causes an error screen 101 (refer to FIG. 4A) to be displayed on the monitor 123 (refer to FIG. 5) prompting the user to choose whether to use the non-optimal cartridge as is or to not use the non-optimal cartridge. Here, the state notification command may be the above-described OK state command or an NG state command. The detection target can be understood through the value of an identifier or parameter of the state notification command. A non-optimal cartridge error is a generic name for an NG command with which the reason why a non-optimal cartridge is non-optimal (cause) can be understood such as a detection target being an expiration date or special colors from the value of an identifier or parameter of the command. In this embodiment, the host control unit 125 that confirms the user's intention by displaying the error screen 101 and prompting the user to make a selection, forms an example of a checking unit.

FIG. 4A illustrates an error screen displayed when a non-optimal cartridge is detected. The error screen 101 illustrated in FIG. 4A is a screen displayed on the monitor 123 by the host apparatus 120 (specifically the host control unit 125) when the controller 41 or 42 detects a non-optimal cartridge. A report 102 stating "There is a non-optimal ink cartridge", detailed information 103 regarding the non-optimal cartridge, a YES button 104 and a NO button 105 allowing the user to select whether or not to use the non-optimal cartridge as is are provided on the error screen 101.

The non-optimal cartridge is used as is when the YES button 104 in the error screen 101 of FIG. 4A is selected, whereas when the NO button 105 is selected the error screen 101 is replaced with an error screen 106 illustrated in FIG. 4B prompting replacement of the ink cartridge. Guidance 107 stating "Please replace with satisfactory ink cartridge", detailed information 108 regarding the ink cartridge to be replaced and an OK button 109 for informing the printer 11 of completion of the replacement are provided in the error screen 106.

After the error screen 101 has been displayed on the monitor 123, the user operates the YES button 104 when the non-optimal cartridge is to be used as is. On the other hand, when the non-optimal cartridge is not to be used and the cartridge is to be replaced, the user operates the NO button 105, then opens the cover 38 and replaces the ink cartridge with a satisfactory ink cartridge, and then operates the OK button 109 on the error screen 106 illustrated in FIG. 4B to confirm completion of the replacement. The user noticing display of the error screen 101, operating the operation unit 124 and selecting the YES button 104 or the NO button 105 typically takes from several seconds to several tens of seconds.

Figure 7:
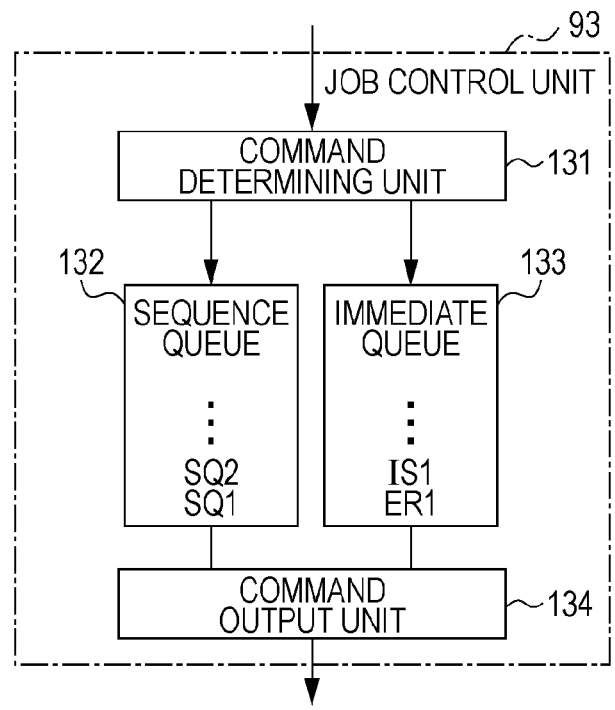
FIG. 7 is a block diagram illustrating the configuration of a job control unit.

FIG. 7 illustrates the configuration of the job control unit 93. The job control unit 93 includes a command determining unit 131, a sequence queue 132, an immediate queue 133 and a command output unit 134. Commands transmitted from the main control unit 82 to the mechanical control unit 83 are input to the job control unit 93. Here, such commands for example include a sequence control command (hereafter, referred to as "sequence command") obtained by interpreting a print language description command included in print data PD and an internally generated command (hereafter, referred to as "internal command") generated on the basis of detection results of various detection processes performed within the controllers 41 and 42. For example, error commands based on detection results of the ink cartridges IC1 to IC8 are internal commands. However, a target state notification command for notifying the mechanical controller 43 of the states of components such as the ink cartridges IC1 to IC8 allocated to the controllers 41 and 42 in order to initiate or stop predetermined operation units (for example, the ink supply device 39) are set without consideration of internal commands.

In the above-described embodiment, the command queues include the sequence queue 132 in which the order in which the commands are issued is important and the immediate queue 133 for commands to processed immediately. Commands in the sequence queue 132 (sequence commands) are issued from the host control unit 125 and the mechanical controller 43 and therefore the order of the commands is always the same for the plurality of controllers 41 and 42.

Also in the immediate queue 133, commands issued from the mechanical controller 43 and the host apparatus 120 are received almost simultaneously and therefore so long as the commands are issued as they are both commands from the master and slave sides will be present in the synchronization processing in the virtual mechanical controller 85. Even if some of the issuing times of commands on the master and slave sides are somewhat shifted from each other (time lag), a retry operation is performed and commands from both sides come to be present eventually in the synchronization processing in virtual mechanical controller 85 through the retry operation.

On the other hand, an internal command generated within the controller 41 or 42 such as an error notification is transmitted to the controller on the other side through communication via the communication I/F units 87 between the controllers 41 and 42. This is because, in order to synchronize the controllers 41 and 42 on the master and slave sides in the virtual mechanical controller 85, it is necessary that the same command be present in both the controllers 41 and 42. Communication via the communication I/F units 87 between the controllers 41 and 42 is serial communication and therefore a comparatively long time is required to transmit commands. Consequently, in the case where a command is issued from the mechanical controller 43 or the host apparatus 120 in a period up until an internal command generated by one of the controllers 41 and 42 reaches the other controller, it cannot be guaranteed that the orders in which the commands will be stored in the immediate queues 133 on the master and slave sides will remain the same.

Accordingly, in this embodiment, the mechanical I/F unit 84 is provided with a determining unit 135 (refer to FIG. 9) and in the case where the determining unit 135 determines that a command is an internal command, without issuing a query regarding the command to the virtual mechanical controller 85 (that is without performing synchronization processing), such an internal command is immediately transmitted to the mechanical controller 43. In other words, if a received command is an internal command, the command is passed through the mechanical I/F unit 84 without synchronization processing being performed. Processing performed by the determining unit 135 will be described hereafter in detail.

The command determining unit 131 illustrated in FIG. 7 determines whether a received command is a sequence command or an urgent command having a high level of urgency (immediate command). The command determining unit 131, in accordance with the result of the determination, stores a sequence command in the sequence queue 132 and stores an urgent command in the immediate queue 133. Commands are stored in the order in which they were acquired in the queues 132 and 133.

The commands stored in the immediate queue 133 are output with priority over those in the sequence queue 132. On the other hand, sequence commands are a type of command for which the order of execution is important and when there are no commands stored in the immediate queue 133 the sequence commands are output in the order in which they are stored. Under this output rule, the command output unit 134 outputs commands with priority from the immediate queue 133 and in a state where there are no commands stored in the immediate queue 133 outputs the sequence commands stored in the sequence queue 132 in the order in which they are stored.

For example, the commands ER1, IS1, . . . are output sequentially in the order in which they are stored from the immediate queue 133 illustrated in FIG. 7. Furthermore, the commands SQ1, SQ2, . . . are output in turn in the order in which they were stored from the sequence queue 132. In the example of FIG. 7, the error command ER1 and the state notification command IS1 (IC state notification command) are stored in the queue 133.

The command output unit 134 waits for a response or a request to the job control unit 93 from the downstream sequence control unit 94. Once a response stating that the previous command has been output is received through the sequence control unit 94 from the mechanical I/F unit 84, the command output unit 134 outputs the next command. Furthermore, when a retry request (retransmission request) requesting retransmission of a command is received through the sequence control unit 94 from the mechanical I/F unit 84, the command output unit 134 outputs the same command as was previously output one more time.

In the case where an urgent command is received from the job control unit 93, the sequence control unit 94 illustrated in FIG. 6 immediately outputs the command. Furthermore, when a sequence command is received, after receiving notification of completion of the previous predetermined operation through the mechanical I/F unit 84 from the mechanical controller 43, the sequence control unit 94 outputs the command when the operation start timing of the predetermined command to be performed next is reached.

Upon receiving a sequence command, the sequence control unit 94 outputs the sequence command to the mechanical I/F unit 84 when a predetermined timing is reached in accordance with a predetermined sequence. Sequence commands include for example a transport command, a suction command, a first carriage initiation command (command to move the carriage in the main scanning direction), a second carriage initiation command (command to move the carriage in sub-scanning direction) and a suction release command. The mechanical control unit 83 transmits these sequence commands at appropriate timings in line with the progress of the processing of the head control unit 89 (refer to FIG. 6) or at appropriate timings in line with the progress of the processing on the mechanical controller 43 side.

When only one of the two controllers 41 and 42 detects a non-optimal cartridge, the controller on the side that has not detected a non-optimal cartridge generates and transmits an OK state command to the mechanical controller 43. On the other hand, the controller on the side that has detected a non-optimal cartridge generates and transmits an NG state command to the host control unit 125. In this case, an OK state command is immediately stored in the queue 133 in one controller, whereas in the other controller an NG state command is transmitted to the host control unit 125, an error release notification is waited for and an issued OK state command is then stored in the queue 133. For example, in order to acquire device state information from the mechanical controller 43, the host control unit 125 periodically transmits a device state acquisition command SG (refer to FIG. 10), which will be described below, to the controllers 41 and 42. At this time, supposing a configuration is adopted in which a device state acquisition command SG are stored in the queue 133, in one controller, an OK state command is immediately stored in the queue 133 in accordance with a detection result of satisfactory cartridges, whereas in the other controller, there is a delay of several seconds to several tens of seconds from after an error clearance notification is issued due to the YES button being operated, until an issued OK state command is stored in the queue 133. In this case, a situation may occur in which a device state acquisition command SG is stored in the queue 133 of the one controller after an OK state command and an OK state command whose issuing was delayed is stored after a device state acquisition command SG in the queue 133 of the other controller. In this embodiment, a configuration is adopted in which device state acquisition commands SG, which are issued comparatively frequently, are not stored in the queues 133A and 133B so that even though a few mismatches in the orders in which commands are stored occur in the queues 133A and 133B, the number thereof can be reduced.

Here, it is necessary for the mechanical controller 43 to be accurately notified of the states of all components such as the ink cartridges IC1 to IC8 allocated to the controllers 41 and 42 by state notification commands. Accordingly, it is not possible for a state notification command to go through to the mechanical controller 43 as is from the mechanical I/F unit 84 without passing through the virtual mechanical controller 85. Supposing a configuration is adopted in which a state notification command is allowed to go through to the mechanical controller 43, in the case where an OK state command from one controller goes through, the mechanical controller 43 causes the pressurizing pump 66 to be driven and at this time a case may occur in which at least one ink cartridge IC connected to the other controller is in a non-optimal or abnormal state. In this case, there is a risk that inconvenience will be caused by ink being pressurized and supplied from the non-optimal or abnormal ink cartridge IC by driving of the pressurizing pump 66. Then, a NG state command is issued and received by the mechanical controller 43 after some time but since the pressurizing pump 66 has been driven during this period there is a risk that ink will have already been pressurized and supplied from the non-optimal or abnormal ink cartridge. Therefore, it is necessary that state notification commands from the controllers 41 and 42, which monitor the states of the components allocated thereto, not go straight through to the mechanical controller 43 but are only transmitted to the mechanical controller 43 after it has been possible to confirm that commands from both sides are present in the virtual mechanical controller 85. Accordingly, in this embodiment, regarding state notification commands, in the case where a command is received by the determining unit 135 of the mechanical I/F unit 84 and identified from the identifier of the command as being a state notification command (OK state command or NG state command), a query is made to the virtual mechanical controller 85.

When a command from the other side does not arrive at the virtual mechanical controller 85 and a retry process is repeatedly performed, before long a set time elapses, a timeout occurs and a command transmission error is generated. Furthermore, supposing that, when a non-usable cartridge such as one that is out of ink is detected by only one of the two controllers, the controller on the side on which a non-usable cartridge has not been detected attempts to output an OK state command to the mechanical controller, and on the other hand the controller on the side on which the non-usable cartridge has been detected attempts to output an NG state command to the mechanical controller. In this case, a situation occurs in which the commands do not match in the synchronization processing in the virtual mechanical controller and a command transmission error is generated.

In contrast to this, in this embodiment, the mechanical control units 83 of the controllers 41 and 42 employ merge processing in which the merge processing unit 83A combines (merges) detection results from both the master and slave sides and therefore state notification commands based on the results of the merge processing come to be the same in both of the controllers 41 and 42. Thus, a situation is avoided that occurs when only one of the two controllers 41 and 42 detects a non-optimal cartridge and due to mismatching of commands in the virtual mechanical controller 85, the above-described retry operation is repeatedly performed and a timeout occurs.

Furthermore, in this embodiment, when only one of the two controllers 41 and 42 detects a non-usable cartridge such as one that is out of ink, since a selection is not made to continue to use a non-usable cartridge as is and to change the command to an OK state command, querying of the host control unit 125 and waiting until an error clearing notification is received does not occur and a decision is made using the NG state command. Accordingly, instead of querying the host control unit 125, state notification commands are transmitted by communication between the respective communication I/F units 87 of the controllers 41 and 42 and merging is performed. Since merge processing is performed commonly in both the controllers 41 and 42 before state notification commands are issued, time differences in the period during which state notification commands are stored in the individual queues 133 substantially do not occur and it is not likely that differences will occur in the orders of commands in the queues 133A and 133B. Thus, it comes to be that commands from both sides are present in the synchronization processing in the virtual mechanical controller 85 and generation of command transmission errors when a non-usable cartridge is detected can be avoided.

The mechanical control unit 83 generates state notification commands on the basis of detection results after merge processing performed by the merge processing unit 83A. Such a state notification command may be an OK state command (normal state command) when the detection result after the merge processing is "OK" or an NG state command (abnormal state command) when the detection result after the merge processing is "NG". The mechanical control unit 83 generates an OK state command in the case where the result of the merge processing is normal (OK) and on the other hand generates an NG state command in the case where the result of the merge processing is abnormal (NG).

If the merged results of the merge processing are normal (OK) for all of the detection targets in the non-usable cartridge detection processing, these detection targets including for example there being a cartridge that is out of ink, there being a cartridge for which there is a mounting failure and there being a cartridge that is of the wrong color, the mechanical control unit 83 generates an OK state command and transmits the command to the mechanical I/F unit 84. Furthermore, if a merged result of the merge processing is abnormal (NG) for at least one of the detection targets of the non-usable cartridge detection processing such as there being a cartridge that is out of ink, there being a cartridge for which there is a mounting failure or there being a cartridge that is of the wrong color, the mechanical control unit 83 generates an NG state command and transmits the command to the mechanical I/F unit 84. Furthermore, in the case where the detection result of at least one of the detection targets in the non-optimal cartridge detection processing is abnormal "NG", the mechanical control unit 83 generates an NG state command through which the fact that there is a non-optimal cartridge can be identified and transmits this command to the host control unit 125 through the error management unit 86 and the main control unit 82.

When the mechanical control unit 83 has transmitted an NG state command to the host control unit 125, the mechanical control unit 83 waits until it receives an error clearance notification, which is a response to the NG state command, from the host control unit 125. In this case, when the detection results of the non-optimal cartridge detection processing in the respective mechanical control units 83 on the master and slave sides are different, the mechanical control unit 83 on the side upon which a non-usable cartridge has been detected waits until it receives an error clearance notification.

The host control unit 125 in this embodiment is configured to periodically or non-periodically transmit a device state acquisition request to the controllers 41 and 42. Upon receiving a device state acquisition request from the host control unit 125, the respective main control units 82 of the controllers 41 and 42 transmit device information, which is periodically or non-periodically acquired from the mechanical controller 43 and accumulated, to the host control unit 125 as a response to the request. Then, when transmitting device state information to the host control unit 125, the main control units 82 both transmit an NG state command together therewith.

Figure 10:
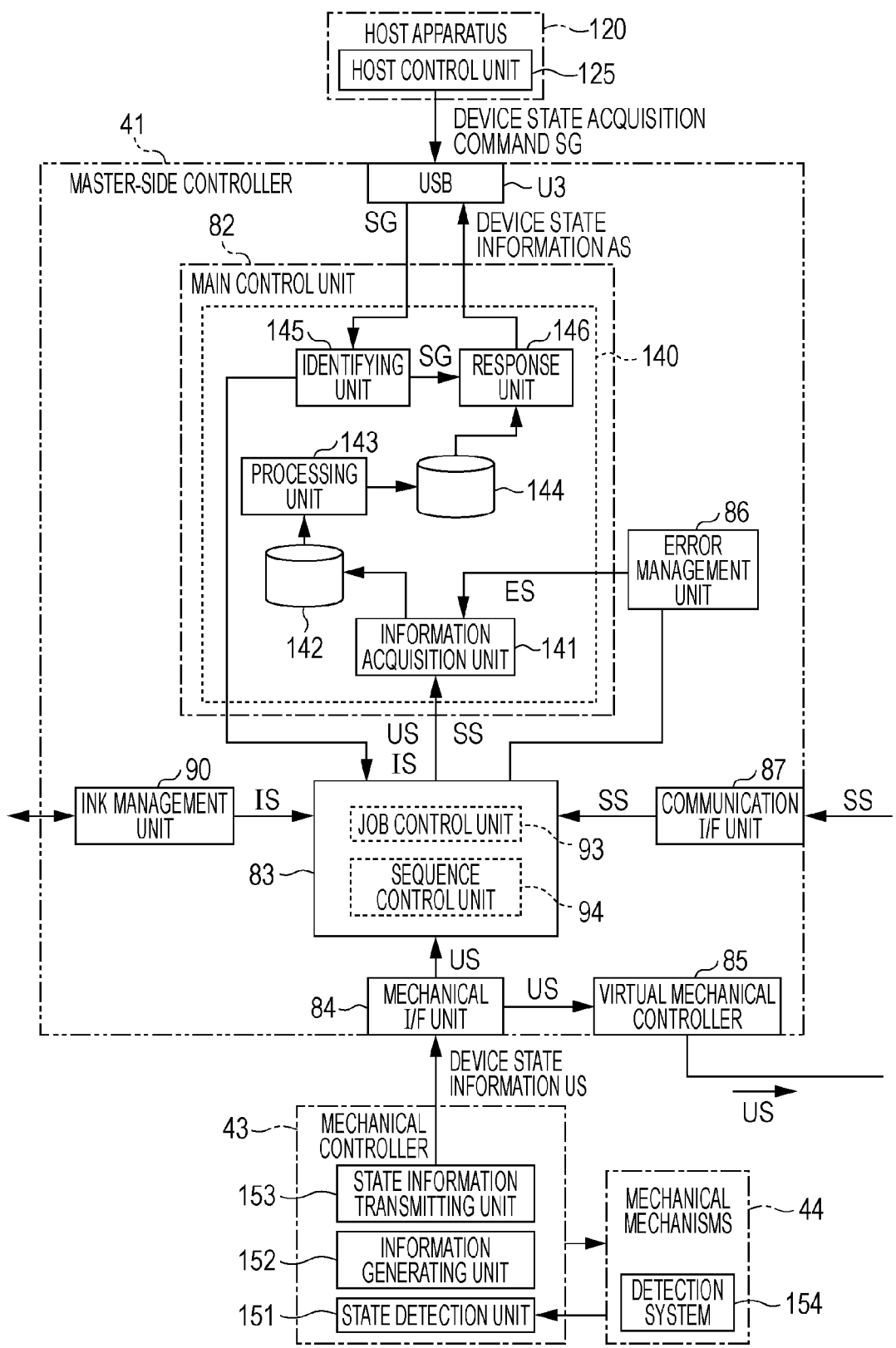
FIG. 10 is a block diagram for explaining the device state information transmission function of a controller.

FIG. 10 is a block diagram illustrating the functional configuration through which device state information US is transmitted to the host control unit 125 when a controller receives a device state acquisition command from the host control unit 125.

This embodiment is characterized by the fact that a device state acquisition command SG (state information acquisition request) from the host control unit 125 is not transmitted to the mechanical controller 43. In this embodiment, the master-side controller 41 and the slave-side controller 42 have the same configuration with respect to this function and therefore description will only be made for the master-side controller 41 illustrated in FIG. 10.

In the controller 41, the main control unit 82 receives a state information acquisition command SG. In this embodiment, the main control unit 82 includes an information transferring unit 140 as an example of a response unit. The information transferring unit 140 has a function of receiving a device state acquisition command SG and returning (transmitting) device state information of the mechanical controller 43 to the host control unit 125 in the form of a reply.

As illustrated in FIG. 10, the information transferring unit 140 includes an information acquisition unit 141, a first storage unit 142 (first buffer), a processing unit 143, a second storage unit 144 (second buffer), an identifying unit 145 and a response unit 146.

Furthermore, the mechanical controller 43 illustrated in FIG. 10 includes a state detection unit 151, an information generating unit 152 and a state information transmitting unit 153 as functional structural units for acquiring device state information US.

The state detection unit 151 detects the states of for example the carriage driving system, the transporting system and the cleaning system included in the mechanical mechanisms 44 on the basis of detection signals from a detection system 154 including various sensors, encoders and the like for detecting the states of the mechanical mechanisms 44.

The information generating unit 152 generates state information on the basis of the detection information of the state detection unit 151. That is, the information generating unit 152 generates state information regarding mechanisms such as the carriage driving system, the transporting system and the cleaning system included in the mechanical mechanisms 44 on the basis of the detection information of the state detection unit 151. Examples of state information of the carriage driving system include information on the position (X direction position and Y direction position) and operation state of the carriage 27. Furthermore, examples of state information of the transporting system include information on the transport position and transport operation state (state such as transport in progress, suction in progress, etc.) of the sheet 13. Examples of state information of the cleaning system include information regarding the cap position state and the driving state of the cleaning pump. Furthermore, there is information on the temperature of the drying device 16.

The state information transmitting unit 153 has a function of transmitting the device state information US including various state information generated by the information generating unit 152 to the master-side controller 41. In this embodiment, the state information transmitting unit 153 transmits the latest device state information US every predetermined time interval on the basis of a clock signal from a clock circuit, which is not illustrated. In this case, a configuration is adopted in which rather than a device state information acquisition command SG being received from the host control unit 125 and the device state information US then being transmitted in the form of a response to this, the device state information US is transmitted autonomously every predetermined time interval. In this embodiment, a predetermined value in the range of 0.1 to 10 seconds is adopted as the predetermined time interval. Of course, the predetermined time interval is not limited to a fixed time interval and may be a non-fixed time interval.

Thus, the master-side controller 41 receives the device state information US every predetermined time interval. Upon receiving the device state information US, the mechanical I/F unit 84 of the master-side controller 41 transmits the device state information US to the slave-side controller 42 through the virtual mechanical controller 85 and the communication line SL3. Therefore, the device state information US transmitted from the mechanical controller 43 is received by both the controllers 41 and 42 on the master and slave sides. The mechanical I/F unit 84 transmits the received device state information US to the mechanical control unit 83.

In addition, as described above, along with state information IS such as detection results from the ink management unit 90 being input to the mechanical control unit 83, state information SS such as detection results for components and information on the amounts of consumed ink and commands transmitted from the other controller (in this example the slave-side controller 42) through the communication I/F units 87, are also input to the mechanical control unit 83.

After being temporarily stored in the queues 132 and 133 within the job control units 93, commands among the various types of information input to the mechanical control unit 83 are output in sequence in accordance with a specified output rule. Furthermore, the mechanical control unit 83 transmits the device state information US and the state information IS and SS to the main control unit 82. At this time, after the mechanical I/F unit 84 receives the device state information US from the mechanical controller 43, the device state information US then immediately arrives at the main control unit 82.

The information acquisition unit 141 acquires the device state information US and the commands IS and SS received by the main control unit 82. Furthermore, the information acquisition unit 141 also acquires an error command ES received by the main control unit 82 from the error management unit 86. The information acquisition unit 141 stores the received device state information US and the commands IS, SS, and ES in the first storage unit 142. The master-side controller 41 and the processing in which the device state information US received from the mechanical controller 43 is stored in the first storage unit 142 correspond to an information receiving unit.

The processing unit 143 performs information processing in which the device state information US and the state information SS are processed so as to be easier to handle by the host control unit 125. The state information SS includes state information regarding components such as the ink cartridges IC and the recording heads 29 allocated to the other controller. This type of state information includes for example information on the amounts of ink remaining in the allocated ink cartridges IC and information on the amounts of ink consumed by the allocated recording heads 29. Then, the processing unit 143 processes the amounts of ink remaining in the ink cartridges IC1 to IC4 allocated to the master side and the amounts of ink remaining in the ink cartridges IC5 to IC8 allocated to the slave side as a combined total of ink consumed in the eight ink cartridges IC1 to IC8. Furthermore, the processing unit 143 separately totals the amounts of ink consumed by the recording heads 29B allocated to the master side and the amounts of ink consumed by the recording heads 29A allocated to the slave side for the individual types of ink (colors of ink) and processes these amounts as information on the amounts of ink consumed including the respective amounts of ink consumed in the eight ink cartridges IC1 to IC8. The processing unit 143 stores the state information generated by the information processing and the device state information US that by nature does not need to be subjected to processing in the second storage unit 144. Part of the device state information US is subjected to processing in which a predetermined calculation is performed to make the information easier to use by the host control unit 125.

The identifying unit 145 performs command identifying processing in which commands input from the host control unit 125 are identified on the basis of their identifiers. In the case where a command is identified as being a device state acquisition command SG, the identifying unit 145 transmits the device state acquisition command SG to the response unit 146. As for commands identified by the identifying unit 145 as being commands other than device state acquisition commands SG, the commands are transmitted to the mechanical control unit 83 after being subjected to predetermined processing by the main control unit 82 as required. Commands transmitted to the mechanical control unit 83 include sequence commands and urgent commands.

Upon receiving a device state acquisition command SG from the host control unit 125 via the identifying unit 145, the response unit 146 reads out device state information AS including the device state information US and the state information from the second storage unit 144 and transmits this read out device state information AS to the host control unit 125 via the serial communication port U3 (response step). In this embodiment, the host control unit 125 requests transmission of the device state information AS by transmitting a device state acquisition command SG to the controllers 41 and 42 every predetermined time interval. The host control unit 125 of this embodiment transmits a device state acquisition command SG to the controllers 41 and 42 every predetermined time interval on the basis of a clock signal from a clock circuit, which is not illustrated, inside the host apparatus 120. A predetermined value in the range of for example 0.1 to 10 seconds is adopted as an example of the predetermined time interval at which the host control unit 125 transmits a device state acquisition command SG. Of course, the predetermined time interval is not limited to a fixed time interval and may be a non-fixed time interval. In this embodiment, a time interval T1 at which the mechanical controller 43 transmits device state information US and a time interval T2 at which the host control unit 125 transmits a device state acquisition command SG are set to the same value or to similar values such that one value being twice the size of the other value or smaller.

The time interval at which the host control unit 125 transmits a device state acquisition command SG is set so that the latest device state information AS, which is constantly changing, can be acquired. For example, if the time interval is made too short, much wasteful processing will be performed due to device state information AS that has hardly changed being repeatedly acquired, whereas if the time interval is made too long, device state information AS that cannot keep up with the changes in device states and exhibits latency will be obtained and control approximating real-time control will become impossible. Therefore, in this embodiment, the time interval at which a device state acquisition command SG is to be transmitted is set with consideration of the changes in state within the printer 11. Furthermore, the time interval at which the device state information US is transmitted by the state information transmitting unit 153 of the mechanical controller 43 matches the time interval at which the device state acquisition command SG is transmitted by the host control unit 125 and is set so as to be the same time interval or a similar time interval.

Thus, in this embodiment, information provision processing in which device state acquisition commands SG are transmitted between the host control unit 125 and the controllers 41 and 42 and replies are made thereto, and information receiving processing of receiving device state information US is performed between the mechanical controller 43 and the controller 41, are performed asynchronously. Then, the time interval at which the device state acquisition command SG is transmitted and the time interval at which the device state information US is transmitted asynchronously with each other, are adjusted so that the device state information US can be acquired in real time substantially the same as a case in which for the information provision processing and the information receiving processing performed asynchronously with each other a configuration is employed in which the mechanical controller 43 responds to requests from the host control unit 125.

Furthermore, the main control unit 82, which is provided midway along a data transmission path between an input unit, which is for inputting data and commands from the host control unit 125, and the job control unit 93, is provided with the information transferring unit 140, which is an example of a response unit. Therefore, at least device state acquisition commands SG avoid passing through the job control unit 93.

Figure 9:
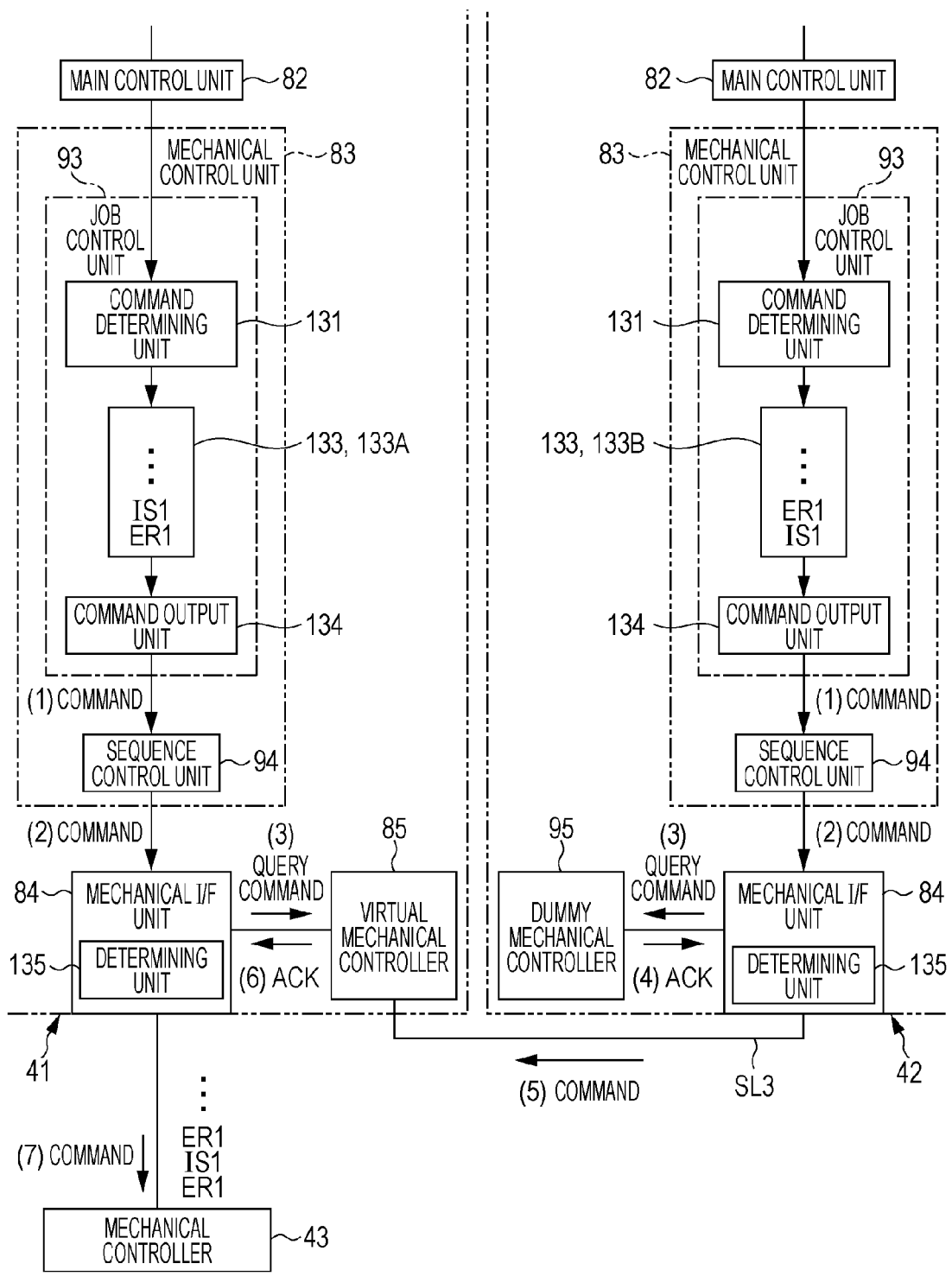
FIG. 9 is a block diagram for explaining the command output function of a controller.

FIG. 9 is a block diagram for explaining command output processing. In FIG. 9, only the immediate queue 133 is illustrated inside the job control unit 93. As illustrated in FIG. 9, the flows of processing operations (indicated by arrows in the figure) performed within the master-side controller 41 and the slave-side controller 42 are the same.

As illustrated in FIG. 9, the mechanical I/F units 84 each include the determining unit 135. The determining unit 135 determines whether a command received by the mechanical I/F unit 84 from the sequence control unit 94 is an internal command or not. In more detail, the determining unit 135 is capable of determining whether a command is an internal command, a command issued by the host control unit 125 (host apparatus 120), or a command issued by the mechanical controller 43. In this embodiment, commands each include an identifier (for example, an identification number of a predetermined number of bits) that identifies what type of command the command is and the determining unit 135 determines whether or not a command is an internal command on the basis of the identifier of the command. Here, in this embodiment, as described above, state notification commands (OK state command or NG state command) are not determined as being internal commands. Instead of providing each command with an identifier that identifies what type of command the command is, a configuration may be adopted in which only internal commands are provided with an identifier. Furthermore, a method may be adopted in which a flag is set within a packet in which a command is transmitted and whether or not the command is an internal command is determined on the basis of the value of the flag. A command number can be given as an example of such an identifier.

Hereafter, command output processing of this embodiment will be described using FIG. 8 and FIG. 9. The main control unit 82 outputs commands obtained by performing command analysis on input print data, commands input from the host apparatus 120, commands input from the mechanical controller 43 (input step), and commands issued inside of the controllers 41 and 42 (command generating step) to the mechanical control unit 83. What types of commands the commands input to the mechanical control unit 83 are is determined by the command determining unit 131. The command determining unit 131 determines whether an input command is a sequence command or an urgent command on the basis of the identifier included in the command. On the basis of the result of the determination, sequence commands are stored in the order in which they were obtained in the sequence queue 132 and urgent commands are stored in the order in which they were obtained in the immediate queue 133 (management step). Internal commands and state notification commands are urgent commands and are therefore stored in the immediate queue 133.

The command output unit 134 outputs commands stored in the immediate queue 133 with priority over sequence commands stored in the sequence queue 132. Consequently, basically, while there are commands in the immediate queue 133, outputting of these commands proceeds with priority.

FIG. 8 illustrates the immediate queues 133A and 133B on the master and slave sides. In the queues 133 in FIG. 8, commands enclosed by broken lines among bottom-most-stored commands are commands that are output to the mechanical controller 43. For example, assuming that an error occurs inside the master-side controller 41 and while the slave-side controller 42 is being notified of this error, detection processing is performed by the controllers 41 and 42 and state notification commands based on the results of the detection are generated. In this case, an OK state command IS1 based on the detection result in the slave-side controller 42 is stored in the queue 133B and an NG state command IS1 based on the detection result in the master-side controller 41 is transmitted to the host apparatus 120. As illustrated in FIG. 8A, an error command ER1 is stored in the master-side queue 133A and the OK state command IS1 is stored in the slave-side queue 133B. At this time, the error command ER1 has yet to reach the slave-side queue 133B (state illustrated in FIG. 8A).

Figure 8A:
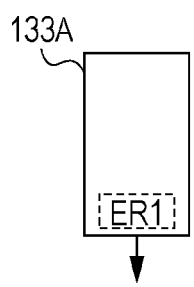
FIGS. 8A to 8D are schematic diagrams for explaining queue processing.

When the storage state is as illustrated in FIG. 8A, the respective job control units 93 output the commands ER1 and IS1 which are stored at positions on the most-downstream side in the immediate queues 133A and 133B (bottommost positions in FIG. 8A and FIG. 9) to the sequence control units 94 ((1) in FIG. 9). The sequence control units 94 output the commands received from the job control units 93 to the mechanical I/F units 84 ((2) in FIG. 9). The commands are urgent commands and are therefore immediately output from the sequence control units 94.

In the mechanical I/F unit 84 on the master side, the determining unit 135 determines that the command ER1 is an internal command. As a result, the master-side mechanical I/F unit 84 immediately outputs the command ER1 to the mechanical controller 43 without querying the virtual mechanical controller 85 about the command. On the other hand, in the mechanical I/F unit 84 on the slave side, the determining unit 135 determines that the state notification command IS1 is not an internal command. As a result, the slave-side mechanical I/F unit 84 transmits the command IS1 to the virtual mechanical controller 85 and since only one such command is present in the virtual mechanical controller 85, a timeout occurs and the slave-side mechanical I/F unit 84 makes a retry request to the mechanical control unit 83.

Figure 8B:
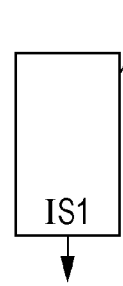

Thus, as illustrated in FIG. 8B, the command IS1, for which a retry request has been made, remains in the queue 133B. Furthermore, the command ER1, which arrived later through communication between the communication I/F units 87, is stored in the queue 133B. In this state illustrated in FIG. 8B, the command IS1 is issued from the queue 133B. In the mechanical I/F unit 84 on the slave side, the determining unit 135 determines that the state notification command IS1 is not an internal command. As a result, the command IS1 is transmitted to the virtual mechanical controller 85 for synchronization processing and since only one such command is present in the virtual mechanical controller 85, a timeout occurs and the slave-side mechanical I/F unit 84 makes a retry request to the mechanical control unit 83.

Figure 8C:
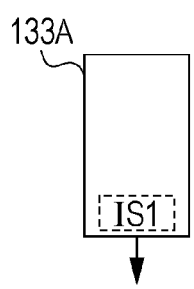

Thus, as illustrated in FIG. 8C, the command IS1, for which a retry request has been made, remains in the queue 133B. Meanwhile, the host control unit 125 displays the error screen 101 (refer to FIG. 4A) on the monitor 123 on the basis of the NG state command previously transmitted to the host control unit 125 from the master-side controller 41. The user is informed of the non-optimal cartridge and is prompted to select whether or not to use the non-optimal cartridge as is by the error screen 101. In the case where the user wishes to use the non-optimal cartridge as is, the user selects and operates the YES button 104 and in the case where the user does not wish to use the non-optimal cartridge, the user selects and operates the NO button 105. In the case where the NO button is selected and operated, after replacing the non-optimal cartridge with a satisfactory cartridge, the OK button 109 is selected and operated in the error screen 106 illustrated in FIG. 4B, which was switched to when the NO button 105 was selected.

As a result, error clearance notifications, as responses to the previous NG state command, arrive at both the controllers 41 and 42 from the host control unit 125. In the master-side controller 41, the mechanical control unit 83 having received the error clearance notification clears the non-optimal detection result error and generates an OK state command. As a result, there is a delay of for example several seconds to several tens of seconds until the user makes a selection and performs an operation on the error screen 101 and the OK state command IS1 is stored in the master-side queue 133A. In this state illustrated in FIG. 8C, the commands IS1 and IS1 are respectively issued from the queues 133A and 133B. In this embodiment, there is a risk that a timeout will occur before both OK state commands IS1 and IS1 are present in the queues 133A and 133B. Accordingly, regarding a state notification command, in which the detection item grasped from value of the parameter of the command is a non-optimal cartridge, upon receiving a retry request a stipulated number of times (for example one or two times), the command output unit 134 gives priority to outputting the command the subsequent time.

In the mechanical I/F units 84, which have received the commands IS1 and IS1, the respective determining units 135 determine that the commands IS1 and IS1 are not internal commands. As a result, the master-side mechanical I/F unit 84 queries the virtual mechanical controller 85 regarding the command IS1 ((3) in FIG. 9) and the slave-side mechanical I/F unit 84 queries the dummy mechanical controller 95 regarding the command IS1 ((3) in FIG. 9).

Upon receiving the query, the dummy mechanical controller 95 on the slave side immediately and unconditionally responds with an ACK signal ((4) in FIG. 9). Upon receiving this response, the slave-side mechanical I/F unit 84 outputs the command IS1 to the communication line SL3 ((5) in FIG. 9). The output command IS1 is received by the master-side virtual mechanical controller 85.

Upon receiving a command IS1 from both of the mechanical I/F units 84 on the master and slave sides, the virtual mechanical controller 85 determines whether the commands IS1 and IS1 match each other. In the synchronization processing in the virtual mechanical controller 85, it is checked whether identical commands IS1 and IS1 (in detail, both OK state commands) are present, and when the commands IS1 and IS1 match each other, the virtual mechanical controller 85 responds with an ACK signal to the master-side mechanical I/F unit 84 ((6) in FIG. 9). Then, upon receiving the ACK signal as a response, the master-side mechanical I/F unit 84 transmits the command IS1 to the mechanical controller 43 ((7) in FIG. 9). That is, once it has been confirmed that identical commands are present in synchronization processing in the virtual mechanical controller 85, the command IS1 is transmitted from the master-side mechanical I/F unit 84 to the mechanical controller 43 (output step).

Figure 8D:
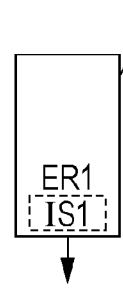

After that, the queues 133A and 133B are in the storage states illustrated in FIG. 8D. The slave-side command output unit 134 issues the command ER1 from the queue 133B. In the slave-side mechanical I/F unit 84, the determining unit 135 determines that the command ER1 is an internal command. As a result, a query is not made to the dummy mechanical controller 95 and the command ER1 is transmitted to the virtual mechanical controller 85. In this case, since the received command ER1 is an internal command, even through only one such command is present, the virtual mechanical controller 85 transmits the command to the master-side mechanical I/F unit 84.

In the master-side mechanical I/F unit 84, the determining unit 135 determines that the command ER1 received from the virtual mechanical controller 85 is an internal command and therefore immediately outputs the command as is to the mechanical controller 43. Since it can be identified that the command received from the virtual mechanical controller 85 was determined to be an internal command in the slave-side mechanical I/F unit 84, a configuration may be adopted in which the determination made in the determining unit 135 in the master-side mechanical I/F unit 84 is omitted and a command received from the virtual mechanical controller 85 is immediately output to the mechanical controller 43.

Thus, in this embodiment, although a situation occurs in which incomplete pairs of the commands ER1 and IS1 are present in the most-downstream positions in the queues 133A and 133B (FIG. 8A), device state acquisition commands SG are never stored in the queues 133A and 133B. Consequently, a situation is avoided in which device state acquisition commands SG whose storage orders have shifted while retry requests are performed remain in the queues.

Figure 11A:
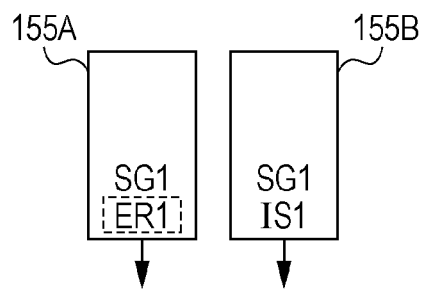
FIGS. 11A to 11C are schematic diagrams for explaining queue processing of a comparative example.
Figure 11B:
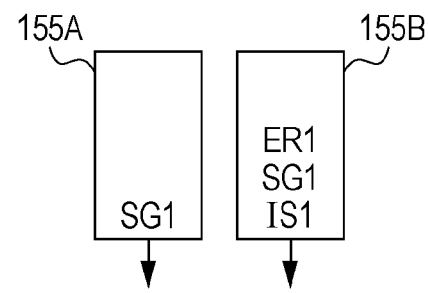
Figure 11C:
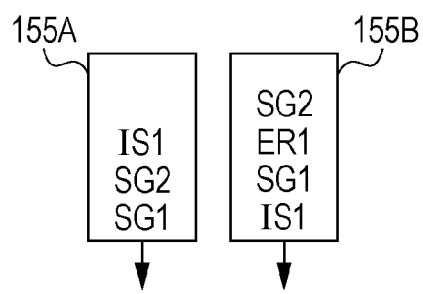

FIG. 11 illustrates queues in the case where command output processing of a comparative example is performed. Hereafter, command output processing in a case in which the configuration of a comparative example is adopted in which device state acquisition commands SG are transmitted to the job control units 93 will be described using FIG. 11. In this comparative example, a device state acquisition command SG to be transmitted to the mechanical controller 43 as a device state acquisition request is stored in a queue of a job control unit within a controller along the way. In FIG. 11, the queues are denoted by the reference symbol 155, with the master-side queue being denoted 155A and the slave-side queue being denoted 155B in order to distinguish them from those of the embodiment.

As illustrated in FIG. 11, an error command ER1 is stored in the master-side queue 155A and an OK state command IS1 is stored in the slave-side queue 155B. Immediately after that, device state acquisition commands SG from the host control unit 125 are stored in the queues 155A and 155B. In this state, the commands ER1 and IS1 are output from the queues 155A and 155B on the master and slave sides. The error command ER1 is determined to be an internal command by the determining unit 135 and is output to the mechanical controller 43. On the other hand, in the slave-side mechanical I/F unit 84, the determining unit 135 determines that the command is not an internal command and therefore the command IS1 is transmitted to the virtual mechanical controller 85 but only one such command is present and a retry request is made.

Therefore, the queues 155A and 155B enter the states illustrated in FIG. 11B. The error command ER1 is delayed and stored in the slave-side queue 155B. The commands SG1 and IS1 are respectively output from the queues 155A and 155B. Only one of each of the commands SG1 and IS1 is present in the virtual mechanical controller 85 and retry requests are made. Meanwhile, the device state acquisition command SG2 is stored in each of the queues 155A and 155B. In addition, an OK state command is stored in the master-side queue 155A as a result of the YES button being selected and operated on the error screen. Since the commands will continue to be stored in the queues 155A and 155B and not be output and retry requests will continue to be made thereafter, the queues 155A and 155B will become full of commands and an error will occur.

In this embodiment, the device state acquisition commands SG are stored in the information transferring unit 140 inside the main control unit 82 prior to reaching the job control unit 93. Consequently, device state acquisition commands SG are never stored in the queues 133. For example, the occurrence of a situation in which, prior to an error command ES (e.g., ER1) transmitted to the other controller through the communication line SL4 being stored in the queue 133, a device state acquisition command SG issued later is stored first, thereby causing the orders in which the commands are stored in the queues 133A and 133B to become different, can be reduced.

Furthermore, even if a time lag occurs during a period in which a non-optimal cartridge is detected by only one controller and a state notification command is stored in each of the queues 133A and 133B, the occurrence of a situation, in which the orders in which commands are stored in the queues 133A and 133B become different due to device state notification commands SG issued later during this time lag being stored first, can be reduced.

Furthermore, even if the orders in which commands are stored in the queues 133A and 133B are different, the commands ER1, ES1 and ER1 are all output to the mechanical controller 43. In this embodiment, the error command ER1 comes to be output two times to the mechanical controller 43. The error command ER1 is a command used in the case where it is wished to stop operation of the mechanical controller 43 at the time of occurrence of an error. In accordance with the parameter of an error command, "immediately stop", "stop after capping operation" and "do nothing" is instructed. For example, even if the same error command in which a stop instruction parameter is specified is transmitted twice, since just a stop instruction is received when the operation has already stopped, there is no particular problem.

As has been described in detail above, in this embodiment, the following advantages can be obtained.

(1) Upon receiving a device state acquisition command SG, the information transferring unit 140 within the main control unit 82 reads out and transmits, in the form of a response, device state information AS received from the mechanical controller 43 and stored thus far. That is, the information transferring unit 140 asynchronously performs information provision processing, in which a device state acquisition command SG is received from the host control unit 125 and information is transmitted as a response thereto, and information acquisition processing in which device state information US is received from the mechanical controller 43.

Therefore, it is not necessary for a device state acquisition command SG to be transmitted to the mechanical controller 43. Accordingly, even if device state acquisition commands SG are periodically or non-periodically received comparatively often, there is no effect on the output processing of other commands such as error commands and state notification commands. Therefore, the processing of outputting commands from the controllers 41 and 42 to the mechanical controller 43 can be performed comparatively smoothly.

(2) The main control unit 82, which is located midway along a data transmission path from the serial communication port U3 (U4) up to the job control unit 93 having the queue 133, is provided with the information transferring unit 140. Consequently, from the viewpoint of the functional configuration, storing of device state acquisition commands SG in the queues 133 is avoided.

(3) A time interval at which the mechanical controller 43 transmits device state information US and a time interval at which the host control unit 125 transmits a device state acquisition command SG are set to the same value or to similar values such as one value being twice the size of the other value or smaller. Accordingly, the host control unit 125 can efficiently perform state information acquisition processing for acquiring device state information US from the mechanical controller 43 and reduce the number of times information is unnecessarily transmitted and information requests are unnecessarily made.

(4) An error command issued only by the controller on the side on which the error occurred is transmitted to the other controller via the communication line SL4. Consequently, since the same error command comes to be stored in the queues 133A and 133B in the respective controllers 41 and 42 and it can be confirmed in the virtual mechanical controller 85 that commands from both sides are present, the error commands can be synchronously output from the controllers 41 and 42. Then, in this case, the following is true.

(5) Since the contents of state notification commands for instructing the mechanical controller 43 differ depending on whether the state notification command is positive (OK) or negative (NG), the commands are output to the mechanical controller 43 once it has been confirmed by the virtual mechanical controller 85 that the commands from both the controllers 41 and 42 match. Accordingly, a situation in which an inappropriate state notification command is transmitted to the mechanical controller 43 can be avoided. For example, if a configuration is adopted in which, similarly to an error command, a determination is made by the determining unit 135 regarding a state notification command and the state notification command is output without first being transmitted to the virtual mechanical controller 85, when a state detection result is positive in one controller but negative in the other controller, both an OK state command and an NG state command will be output. In this case, situations in which a mechanical mechanism 44, which should be continuing to halt an operation, mistakenly momentarily initiates the operation or a mechanical mechanism 44, which should be allowing an operation to continue, mistakenly momentarily halts the operation, can be avoided.

(6) A configuration is adopted in which detection results for the allocated ink cartridges IC are transmitted between the controllers 41 and 42 through the communication line SL4 and the detection results obtained on the side of one controller and the detection results obtained on the side of the other controller are merged. Consequently, even in the case where the detection result in one controller is abnormal and the detection result in the other controller is normal, the detection processing (merged result) performed by both the controllers 41 and 42 come to match due to the merge processing. As a result, since the commands from both sides match in the synchronization processing in the virtual mechanical controller 85, appropriate commands can be output to the mechanical controller 43.

(7) Furthermore, in a case where a configuration is adopted in which differing OK state and NG state commands are output without merging the detection results in both the controllers 41 and 42, matching commands from both sides are not present in the virtual mechanical controller 85 and no matter how many times a retry operation is performed the commands will still not match and therefore a command transmission error occurs. In contrast, according to this embodiment, state notification commands come to be the same in the controllers 41 and 42 due to the merging processing being performed on the detection results in the controllers 41 and 42 on the master and slave sides and therefore the occurrence of this kind of command transmission error can be avoided. Consequently, an operation of resetting the controllers 41 and 42 due to a command communication error can be avoided as much as possible.

(8) State notification commands corresponding to the detection results of the controllers 41 and 42 are merged and therefore a situation in which an OK state command is transmitted from one controller and an NG state command is transmitted from another controller can be avoided. Consequently, a situation in which the mechanical controller 43 initiates the ink supply device 39, when it should not be initiated, or inappropriately stops the ink supply device 39 while it is operating can be avoided.

(9) In the case where the result of the merge processing is NG, the host control unit 125 is informed of this fact and Y/N is displayed on the monitor 123. Then, once YES or NO has been selected, when the user has selected OK and the cause of the error has been cleared, the error is cleared and an OK state notification is issued. Accordingly, an appropriate OK state notification (OK state command) can be transmitted to the mechanical controller 43. Furthermore, in the case where the result of the merge processing in the controllers 41 and 42 is OK, an appropriate OK state notification (OK state command) can be transmitted to the mechanical controller 43. Therefore, inappropriate starting and inappropriate stopping of operation units such as the ink supply device 39 due to an inappropriate state notification can be avoided.

(10) Although the plurality of controllers 41 and 42 have the same functional configuration as illustrated in FIG. 8, the functions thereof relating to the synchronization processing are different on the master and slave sides but can be realized by a common program.

(11) The ink management unit 90 (detection unit) detects errors such as an out of ink error on the basis of ink-related information acquired from the memory elements 47 of the ink cartridges IC. Then, when an error command generated on the basis of a detection result such as an out of ink error is transmitted to the other controller through the communication I/F units 87 and 87, a checking result of the IC checking process (detection result) is also transmitted together therewith. Accordingly, compared to transmitting them separately, necessary information can be more speedily passed to the other controller. As a result, calculation of the remaining amounts of ink and the merge processing are performed more quickly and processing delays can be avoided.

The above-described embodiment can be modified in the following ways. The information transferring unit 140 is not limited to being provided in the main control unit 82. For example, the information transferring unit 140 may be provided inside the mechanical control unit 83 or between the mechanical control unit 83 and the mechanical I/F unit 84. Furthermore, the information transferring unit 140 may instead be provided between the serial communication port U3 (U4) and the main control unit 82.

A configuration may be adopted in which device state information US is not processed into device state information AS and the device state information US read from the first storage unit 142 is transmitted as is. A configuration can be adopted in which the ink management unit 90, which is an example of a detection unit, does not perform detection of a non-optimal cartridge or a configuration can be adopted in which a checking unit, which checks whether a non-optimal cartridge is to be used as is, is not provided. For example, when an abnormality such as exhaustion of ink, failure of mounting of a cartridge, or mounting of a cartridge of the wrong color is detected by one controller, the merged results of the controllers 41 and 42 both become abnormal and therefore matching abnormal state commands from both sides come to be present in the virtual mechanical controller 85 and therefore the occurrence of command transmission errors can be avoided. However, the other controller also for example performs merging when a normal state is detected, whereby transmission of a normal state command can be avoided and therefore inappropriately starting or stopping an operation unit (for example, the ink supply device 39), due to an inappropriate command being transmitted to the mechanical controller 43, can be avoided as much as possible.

An avoidance unit can be appropriately selected. In the above-described embodiment, the merge processing unit 83A, the determining unit 135 and the host control unit 125 (checking unit) were adopted as an example of an avoidance unit for avoiding transmission errors due to a command from only one side being present in the synchronizing unit (virtual mechanical controller 85), but the invention is not limited to this. For example, only two or one of the merge processing unit 83A, the determining unit 135 and the checking function unit of the host control unit 125 may be adopted. Furthermore, for example, a rearranging unit for changing the order in which commands are stored in the queues 133 may be adopted as an avoidance unit that allows transmission errors to be avoided by performing processing such that matching commands from both sides come to be present in the synchronization unit, as with the merge processing unit 83A. Examples of such a rearranging unit include a sorting unit that puts commands in the queues 133 into a predetermined order such as in the order of a priority rank set in advance, in the order of a command number or in the order of a serial number assigned to the command when the command is generated. Furthermore, an avoiding unit may also be adopted that transmits internal commands generated inside one print control device to another print control device.

A configuration may be adopted in which non-optimal cartridge detection processing is performed but non-usable cartridge detection processing is not performed. Furthermore, in the case where a non-optimal cartridge is detected, a checking unit that checks the user's intention by prompting the user to select OK or NO as to whether to use the non-optimal cartridge as is, may be omitted.

A configuration may be adopted in which the detection results of a detection unit and the amounts of fluid consumed may be separately transmitted to another print control device. Furthermore, calculated values based on the transmitted and received amounts of fluid consumed are not limited to the amounts of fluid remaining in the fluid accommodating vessels and may instead be the amounts of fluid consumed. Furthermore, it is not necessary for the amounts of fluid remaining or consumed in the fluid accommodating vessels to be calculated to such a degree that exhaustion of fluid (exhaustion of ink as an example) can be detected on the basis of the results.

The checking unit is not limited to the host control unit 125 of the host apparatus 120. For example, a checking unit that is connected to the monitor on the mechanical controller 43 side and prompts selection of whether to use a non-optimal component as is may be provided in the mechanical controller 43.

The synchronization unit is not limited to using a method performed by the virtual mechanical controller 85. For example, a configuration may be adopted in which a synchronization circuit is provided between the plurality of print control devices and the mechanical controller 43 as a common output destination of the individual print control devices and once all of the commands from the plurality of print control devices are present in the synchronization circuit, the commands are transmitted to the mechanical controller 43.

The synchronization unit is not limited to receiving commands from each of the output units of the plurality of print control devices and a configuration may be adopted in which information that can be used in the determination of whether commands match is received rather than commands. As an example of such information, identifier information (for example command number) or the like of a command can be given. In short, any configuration that can check whether a command to be output is present in all of a plurality of print control devices is sufficient.

Commands based on detection results of a detection unit may be internal commands individually generated inside the print control devices (for example, controllers). In this case, an internal command is not limited to an error command and may be a command expressing normality (normality notification command) or may be command for making a notification regarding detection results or states corresponding to the above-described three types. If a command is an internal command, a command transmission error generated due to matching commands from all the print control devices not being present in the synchronization processing and a command transmission error generated due to command processing paths being different between print control devices for detection results and only one command arriving at the synchronization processing, can be avoided.

The detection unit is not limited to the ink management unit 90 that detects the state (for example, failure of mounting, exhaustion of ink, non-optimal cartridge) of an ink cartridge, as an example of a component. A nozzle testing unit for testing for clogging of the nozzles of each of the recording heads 29 is provided and a plurality of such nozzle testing units are allocated to and connected to the plurality of controllers 41 and 42 as examples of components. Then, a configuration can also be adopted in which each of the controllers is equipped with a test control unit (detection unit) that has a function of controlling the nozzle testing units and a detection function of detecting clogging of nozzles (nozzle error) on the basis of nozzle testing results of the nozzle testing units. In this case, the other controller is notified of a nozzle test result or a command based on this test result via the communication I/F units 87 and 87 by communication between the controllers 41 and 42. Then, each of the mechanical control units 83 within the controllers 41 and 42 generates a nozzle clogging error command (nozzle error command) on the basis of a merged result obtained by the merge processing unit merging the nozzle test results of the test control units and generates a cleaning command that causes the maintenance device 32 to perform cleaning. Therefore, even in a case where different detection results are obtained by the controllers 41 and 42 on the master and slave sides, the merged results come to be the same and therefore nozzle error commands and cleaning commands based on the merged results can be output to the mechanical controller 43 without causing generation of command transmission errors or inappropriate starting or stopping of operation units. In the case where detection results showing nozzle clogging are obtained, the host control unit 125 (checking unit) may be configured to display a screen prompting the user to select whether or not a cleaning operation should be performed.

Printing units allocated to and controlled by the controllers 41 and 42, as examples of print control devices, are not limited to the recording heads 29. The printing units may be for example carriage driving systems that include carriage motors or may be transport driving systems that include transporting motors. Furthermore, the printing unit can be formed by adding a carriage driving system or a transport driving system to a recording head 29. Furthermore, the printing unit can also be formed of a carriage driving system or a transport driving system.

Not limited to two print control devices, a configuration can be adopted in which three or more print control devices are connected to one another. There may be just one recording head. For example, a configuration may also be adopted in which two or more print control devices are allocated with and control a plurality of head regions (divided nozzle groups) obtained by dividing all the nozzles in a line-type elongated recording head into a plurality of groups and the print control devices output commands to the mechanical controller in synchronization with each other.

The functional units of the controllers illustrated in FIG. 6 may be realized mainly by software by having the CPU execute programs, may be realized by hardware or may be realized through cooperation of software and hardware.

The printing apparatus is not limited to the lateral-type printer 11 and may be a serial printer, a line printer or a page printer. Furthermore, not limited to ink jet printing apparatuses, the invention can be applied to dot impact printing apparatuses.

In the above-described embodiments, the ink jet printer 11 is adopted as a printing apparatus, but instead a fluid ejecting apparatus that discharges or ejects a fluid other than ink may be adopted. Furthermore, the invention can be applied to a variety of liquid ejecting apparatuses equipped with for example liquid ejecting heads that discharge minute liquid droplets. In this case, the term "liquid droplet" refers to the state of a liquid being discharged from the liquid ejecting apparatus and also includes the meaning one whose tail is drawn out into a grain shape, a tear-like shape or a thread shape. Furthermore, here, the term "liquid" may refer to any material that can be ejected by a liquid ejecting apparatus. For example, such a substance may be any substance so long as the substance is in a liquid phase and such substances may include fluids such as high- and low-viscosity liquids, sols, gel water, other inorganic solvents, organic solvents, solutions, liquid resins, liquid metals (metal melts) and substances formed of not just a liquid such as those obtained by dissolving particles of a functional material composed of a solid substance such as a pigment or metal particles into a solvent, or dispersing or mixing such particles in a liquid. In addition, representative examples of liquids include inks, as described in the above embodiment, and liquid crystal. Here, the term "ink" includes various liquid phase substances such as general water-based inks and oil-based inks, and gel inks and hot melt inks. Specific examples of liquid ejecting apparatuses include liquid ejecting apparatuses that eject liquids that include a material, such as an electrode material or a colorant, in the body of a dispersion or solution used in the manufacture of for example liquid crystal displays, electroluminescent (EL) displays, planar light emitting displays, and color filters. Furthermore, the liquid ejecting apparatus may be a liquid ejecting apparatus that ejects a living organic material used in the manufacture of bio-chips, a liquid ejecting apparatus that is used as a precision pipette and ejects a liquid to be used as a sample, a textile printing apparatus or a micro-dispenser. Furthermore, a liquid ejecting apparatus that ejects a lubricating oil with pinpoint precision onto precision mechanisms such as those of watches and cameras, a liquid ejecting apparatus that ejects a transparent resin liquid such as an ultraviolet curable resin onto a substrate in order to form minute hemispherical lenses (optical lenses) used in optical communication devices and the like, or a liquid ejecting apparatus that ejects an etching liquid such as an acid or an alkali in order to etch a substrate or the like, may be adopted. The invention can be applied to any one these types of liquid ejecting apparatuses. In addition, the fluid may be a powder such as toner. The term "fluid" used in this specification does not refer to substances composed solely of gas.

What is claimed is:

1. A print control device for a printing apparatus that is equipped with a plurality of print control devices, which are allocated with and control printing units on the basis of print data from a host control unit, and is equipped with a driving control unit that controls driving of mechanical printing mechanisms on the basis of commands from the print control devices, the print control device comprising:
   an information receiving unit that receives state information transmitted from the driving control unit at periodic or non-periodic time intervals and stores the state information in a storage unit;

a response unit that, upon receiving an information acquisition command from the host control unit, responds by transmitting state information stored in the storage unit to the host control unit;
an input unit that inputs a first command;
a command generating unit that generates a second command inside the print control device;
a management unit that manages first and second commands in the order in which the commands were acquired and outputs the first and second commands in the order in which the commands were acquired;
an output unit that outputs the commands received from the management unit to the driving control unit;
a synchronizing unit that, upon confirming that the same command is present in the respective output units of the plurality of print control devices, allows the output units to output the command, and
an avoidance unit that performs avoidance processing to avoid an error that occurs in the synchronizing unit when the second command is not present in the respective output units of all of the plurality of print control devices;
wherein the information acquisition command is not input to the management unit.

2. The print control device according to claim 1, wherein the response unit is provided midway along a transmission path from the host control unit up to where a command is acquired by the management unit.

3. The print control device according to claim 1, wherein the avoidance unit is a communication unit that transmits the second command to another print control device.

4. The print control device according to any claim 1
wherein a plurality of components included in the printing apparatus are allocated to and connected to the plurality of print control devices,
the print control device further comprises a detection unit that detects the states of the components allocated thereto, and
wherein the command generating unit generates the second command on the basis of a detection result of the detection unit.

5. The print control device according to claim 4,
wherein at least one of the detection units is a unit that detects a non-optimal component among the plurality of components,
wherein the command generating unit, if the detection unit detects a non-optimal component, generates an abnormal state command as a second command and transmits the command to the host control unit, and, if on the other hand the detection unit detects a satisfactory component, generates a normal state command as a second command and transmits the command to the output unit,
wherein the host control unit, upon receiving an abnormal state command, displays guidance including selection options prompting selection of whether or not to use the non-optimal component, and when selection is made to use the non-optimal component from among the selection options in the displayed guidance, performs error clearance notification in which the print control device is told to regard the non-optimal component as satisfactory, and
wherein the avoidance unit is formed of a function in which the command generating unit generates a normal state command, which is issued in the case where a component is satisfactory, upon receiving an error clearance notification.

6. The print control device according to claim 1, wherein the avoidance unit is formed of a function in which the output unit determines whether a command received from the management unit is a first command or a second command and when the command is a first command the output unit outputs the command while synchronization is performed by the synchronizing unit and when the command is a second command the output unit outputs the command without the synchronizing unit performing synchronization.

7. The print control device according to claim 3,
further comprising an information processing unit that performs processing to combine information acquired from another print control device through the communication unit and information of the print control device into one piece of combined information, and
wherein the response unit, upon receiving the information acquisition command, transmits the information stored in the storage unit and the combined information.

8. A printing apparatus that is equipped with a plurality of print control devices, which are allocated with and control printing units on the basis of print data, and is equipped with a driving control unit that controls driving of mechanical printing mechanisms on the basis of commands from the print control devices,
wherein the print control devices are each the print control device according to claim 1.

9. A printing apparatus that is equipped with a plurality of print control devices, which are allocated with and control printing units on the basis of print data, and is equipped with a driving control unit that controls driving of mechanical printing mechanisms on the basis of commands from the print control devices,
wherein the print control devices are each the print control device according to claim 2.

10. A printing apparatus that is equipped with a plurality of print control devices, which are allocated with and control printing units on the basis of print data, and is equipped with a driving control unit that controls driving of mechanical printing mechanisms on the basis of commands from the print control devices,
wherein the print control devices are each the print control device according to claim 3.

11. A printing apparatus that is equipped with a plurality of print control devices, which are allocated with and control printing units on the basis of print data, and is equipped with a driving control unit that controls driving of mechanical printing mechanisms on the basis of commands from the print control devices,
wherein the print control devices are each the print control device according to claim 4.

12. A printing apparatus that is equipped with a plurality of print control devices, which are allocated with and control printing units on the basis of print data, and is equipped with a driving control unit that controls driving of mechanical printing mechanisms on the basis of commands from the print control devices,
wherein the print control devices are each the print control device according to claim 5.

13. A printing apparatus that is equipped with a plurality of print control devices, which are allocated with and control printing units on the basis of print data, and is equipped with a driving control unit that controls driving of mechanical printing mechanisms on the basis of commands from the print control devices,
wherein the print control devices are each the print control device according to claim 6.

14. A printing apparatus that is equipped with a plurality of print control devices, which are allocated with and control printing units on the basis of print data, and is equipped with a driving control unit that controls driving of mechanical printing mechanisms on the basis of commands from the print control devices, wherein the print control devices are each the print control device according to claim 7.

15. An information providing method of providing, in printing apparatus equipped with a plurality of print control devices, which are allocated with and control printing units on the basis of print data from a host control unit, and a driving control unit that controls driving of mechanical printing mechanisms on the basis of commands from the print control devices, information from the driving control unit to the host control unit, the method comprising:

receiving state information from the driving control unit at periodic or non-periodic time intervals and storing the state information in a storage unit;

responding, upon receiving an information acquisition command from the host control unit, by transmitting the state information stored in the storage unit to the host control unit;

outputting a first command input from the input unit and a second command generated by a command generating unit inside the print control device to the output unit in the order in which they were acquired by a management unit that manages the commands in the order in which they are acquired; and performing avoidance processing of avoiding a synchronization error, which occurs in a synchronization process that allows the output units to output a command when is confirmed that the same command is present in the respective output units of the plurality of print control devices, when a second command is not present in the respective output units of all of the plurality of print control devices, wherein the information acquisition command is not input to the management unit.

\* \* \* \* \*